United States Patent
Nishizawa et al.

(10) Patent No.: US 7,599,409 B2
(45) Date of Patent: Oct. 6, 2009

(54) ELECTROMAGNETIC WAVE GENERATING DEVICE

(75) Inventors: Jun-ichi Nishizawa, 6-16, komegafukuro 1-chome, Aoba-ku, Sendai-shi, Miyagi (JP) 980-0813; Ken Suto, Sendai (JP); Tetsuo Sasaki, Sendai (JP); Tadao Tanabe, Sendai (JP); Tomoyuki Kimura, Sendai (JP)

(73) Assignees: Jun-Ichi Nishizawa, Sendai-shi (JP); Tohoku University, Sendai-shi (JP)

( * ) Notice: Subject to any disclaimer, the term of this patent is extended or adjusted under 35 U.S.C. 154(b) by 10 days.

(21) Appl. No.: 10/587,844

(22) PCT Filed: Oct. 29, 2004

(86) PCT No.: PCT/JP2004/016165

§ 371 (c)(1),
(2), (4) Date: Jul. 28, 2006

(87) PCT Pub. No.: WO2005/073795

PCT Pub. Date: Aug. 11, 2005

(65) Prior Publication Data

US 2007/0160093 A1 Jul. 12, 2007

(30) Foreign Application Priority Data

Jan. 29, 2004 (JP) .............................. 2004-055131
Jan. 29, 2004 (JP) .............................. 2004-055134

(51) Int. Cl.
*H01S 3/10* (2006.01)
(52) U.S. Cl. .......................................... 372/21; 372/20
(58) Field of Classification Search ............... 372/20, 372/21
See application file for complete search history.

(56) References Cited

U.S. PATENT DOCUMENTS

| 5,566,197 A * | 10/1996 | Nillsson | 372/20 |
| 2004/0061055 A1* | 4/2004 | Kawase et al. | 250/330 |
| 2005/0134847 A1* | 6/2005 | Hebert et al. | 356/369 |

FOREIGN PATENT DOCUMENTS

| JP | 05 110179 | 4/1993 |
| JP | 10 213828 | 8/1998 |
| JP | 2002-287190 | 10/2002 |

OTHER PUBLICATIONS

Furusawa et al., "Cladding pumped Ytterbium-doped fiber laser with holey inner and outer cladding," Optics Express, vol. 9, 714 (2001).*

*Primary Examiner*—Minsun Harvey
*Assistant Examiner*—Michael Carter
(74) *Attorney, Agent, or Firm*—Oblon, Spivak, McClelland, Maier & Neustadt, L.L.P.

(57) ABSTRACT

An electromagnetic wave generator encompasses a first pump beam emitter (2) configured to emit a first pump beam ($h\nu_1$) having a wavelength larger than one micrometer; a second pump beam emitter (25) configured to emit a wavelength-tunable second pump beam ($h\nu_2$) having a wavelength larger than one micrometer, the wavelength of which is different from the wavelength of the first pump beam ($h\nu_1$); a nonlinear optical crystal (19) configured to generate an electromagnetic wave ($h\nu_3$) of a difference frequency between the first pump beam ($h\nu_1$) and second pump beam ($h\nu_2$); and an optical system ($M_1$, $M_2$, 18) configured to irradiate the first pump beam ($h\nu_1$) and second pump beam ($h\nu_2$) to the nonlinear optical crystal (19), by adjusting an external intersection angle between the first pump beam ($h\nu_1$) and second pump beam ($h\nu_2$) within 0.5° at the difference frequency of 1 THz. Here, a frequency-tunable terahertz electromagnetic wave ($h\nu_3$) is generated in the nonlinear optical crystal (19), by changing the frequency of the second pump beam ($h\nu_2$), being liked with the change of the external intersection angle.

13 Claims, 17 Drawing Sheets

OTHER PUBLICATIONS

Tanabe, T. et al., "Frequency-tunabel high-power terahertz wave generation from GaP", Journal of Applied Physics., vol. 93, No. 8, pp. 4610 to 4615, Apr. 15, 2003.

Tanabe, T. et al., "Frequency-tunable terahertz Wave generation via excitation of phonon-polaritons in GaP", Int. Symp. Comp. Semicond., pp. 193 to 194, 2003.

Tanabe, T. et al., "Characteristics of terahertz- wave generation from GaSe crystals", Journal of Physics D: Appl. Phys., vol. 37, No. 2, pp. 155 to 158, Jan. 21, 2004.

Wei Shi et al., "Efficient, tunable, and coherento. 18-5. 27-THz source based on GaSe crystal", Optics Letters, vol. 27, No. 16, pp. 1454 to 1456, Aug. 15, 2002.

* cited by examiner

ELECTROMAGNETIC WAVE GENERATING DEVICE

FIELD OF THE INVENTION

The present invention relates to a frequency-tunable electromagnetic wave generator in terahertz band.

BACKGROUND-ART

A terahertz electromagnetic wave generator as shown in FIG. 1, which uses polariton mode in a Lithium Niobate (LiNbO$_3$) crystal as a dielectric material, is known as a wavelength-tunable generator of a terahertz electromagnetic wave. In other words, in FIG. 1, a first pump beam (a first pump beam may simply be called "a pump beam") hv$_1$ and a second pump beam (a second pump beam may simply be called "a signal beam" or "an idler beam") hv$_2$ generate a terahertz electromagnetic wave by a difference-frequency generation hv$_3$=hv$_1$-hv$_2$ with first and second pump beams entering a Lithium Niobate crystal.

Thus, a coherent light of the terahertz electromagnetic wave hv$_3$ in the frequency band of approximately from 0.7 THz to 2.5 THz is obtained. However, the above-described frequency band is too narrow as a tunable-spectral band for identifying a variety of living materials, by measuring differences in the terahertz electromagnetic wave spectroscopic spectra. By using spectrum of a higher frequency band, the difference of spectrum patterns will become clear so that various molecules can be identified.

When the frequency exceeds 3 TH, because the absorption coefficient of LiNbO$_3$ crystal in a terahertz band becomes extremely large, the output from LiNbO$_3$ crystal decreases significantly, which is one of the causes for limiting frequency band. Moreover, due to the degree of phase mismatching in parallel directions of two pump beams hv$_1$ and hv$_2$ being large, as shown in FIG. 1, the angle matching method must be employed with a large intersection angle between the pump beams hv$_1$ and hv$_2$ at a large output-extraction angle of the terahertz electromagnetic wave hv$_3$. In FIG. 1, terahertz electromagnetic waves hv$_3$ are extracted through a prism array consisting of multiple silicon (Si) prisms 5, which is located on the surface of the LiNbO$_3$ crystal so as to increase the output-extraction angle of the terahertz electromagnetic waves hv$_3$. Therefore, the terahertz electromagnetic wave hv$_3$, the pump beam hv$_3$, and the beam hv$_3$ overlap poorly which causes both frequency band and efficiency to decrease.

On the other hand, it may be also possible that one pump beam enters the LiNbO$_3$ crystal and generates the terahertz electromagnetic wave by a parametric oscillation. In such a LiNbO$_3$ parametric-oscillator-type terahertz generator, by conducting an injection seeding with a continuous wave (CW) laser diode (semiconductor laser), the spectrum linewidth of the generated terahertz electromagnetic wave hv$_3$ can be narrowed to approximately 100 MHz.

In other words, by assigning the LiNbO$_3$ terahertz generator as a slave laser (host laser), and the CW laser diode with narrow spectrum width as a seed laser (master oscillator), the combination of the above two lasers, achieving both characteristics of the slave laser (host laser) and the seed laser (master oscillator), can generate a terahertz electromagnetic wave hv$_3$ with a narrow spectrum width, and then. Using a high stability laser as the seed laser and a high output laser as the slave laser, an oscillation of high stability and high output can be achieved. However, because of the mode hopping of the CW laser diode, on the other hand, it may be difficult to perform frequency-sweep continuously in a wide band. On the other hand, if the injection seeding is not conducted, because the spectrum width becomes extremely wide to exceed 100 GHz (0.1 THz), and the resolution decreases significantly, then it becomes insufficient for the capability to identify substances, in view of a narrow frequency band.

SUMMARY OF THE INVENTION

An object of the present invention is to provide a frequency-tunable electromagnetic wave generator in a terahertz band, overcoming the above-described disadvantages, with wide frequency band, high output, high capability of substance identification and, moreover, being swept without mode-hop.

In view of the above-described object, a first aspect of the present invention inheres in an electromagnetic wave generator encompassing (a) a first pump beam emitter configured to emit a first pump beam having a wavelength larger than one micrometer; (b) a second pump beam emitter configured to emit a wavelength-tunable second pump beam having a wavelength larger than one micrometer, the wavelength of which is different from the wavelength of the first pump beam; (c) a nonlinear optical crystal configured to generate an electromagnetic wave of a difference frequency between the first and second pump beams; and (d) an optical system configured to irradiate the first and second pump beams to the nonlinear optical crystal, by adjusting an external intersection angle between the first and second pump beams within 0.5° at the difference frequency of 1 THz. Here, a frequency-tunable terahertz electromagnetic wave is generated in the nonlinear optical crystal, by changing the frequency of the second pump beam, being liked with the change of the external intersection angle.

A second aspect of the present invention inheres in an electromagnetic wave generator encompassing (a) a first pump beam emitter configured to emit a first pump beam; (b) a second pump beam emitter configured to emit a wavelength-tunable second pump beam, the wavelength of which is different from the wavelength of the first pump beam; and (c) a nonlinear optical crystal configured to generate an electromagnetic wave of a difference frequency between the first and second pump beams. Here, a frequency-tunable terahertz electromagnetic wave is generated in the nonlinear optical crystal, by changing the frequency of the second pump beam.

A third aspect of the present invention inheres in an electromagnetic wave generator encompassing (a) a first pump beam emitter configured to emit a first pump beam; (b) a second pump beam emitter configured to emit a wavelength-tunable second pump beam, the wavelength of which is different from the wavelength of the first pump beam; (c) a nonlinear optical crystal configured to generate an electromagnetic wave of a difference frequency between the first and second pump beams; (d) an optical system configured to irradiate the first and second pump beams to the nonlinear optical crystal, by adjusting an external intersection angle between the first and second pump beams; and (e) a timing control mechanism configured to control arrival timing of pulses of the first and second pump beams to the nonlinear optical crystal. Here, a frequency-tunable terahertz electromagnetic wave is generated in the nonlinear optical crystal, by changing the frequency of the second pump beam, being liked with the change of the external intersection angle.

A fourth aspect of the present invention inheres in an electromagnetic wave generator encompassing (a) a first pump beam emitter configured to emit a first pump beam; (b) a second pump beam emitter configured to emit a wavelength-tunable second pump beam, the wavelength of which is different from the wavelength of the first pump beam; (c) a nonlinear optical crystal configured to generate an electromagnetic wave of a difference frequency between the first and second pump beams, and to emit the electromagnetic wave from an electromagnetic wave exit face; (d) an optical system configured to irradiate the first and second pump beams to the nonlinear optical crystal, by adjusting an external intersection angle between the first and second pump beams; and (e) an angle control mechanism configured to control an angle of the electromagnetic wave exit face against an optical axis of the first pump beam. Here, a frequency-tunable terahertz electromagnetic wave is emitted from the electromagnetic wave exit face, by changing the frequency of the second pump beam, being liked with the change of the external intersection angle and the change of the angle of the electromagnetic wave exit face.

DETAILED DESCRIPTION OF THE INVENTION

Figure 1:
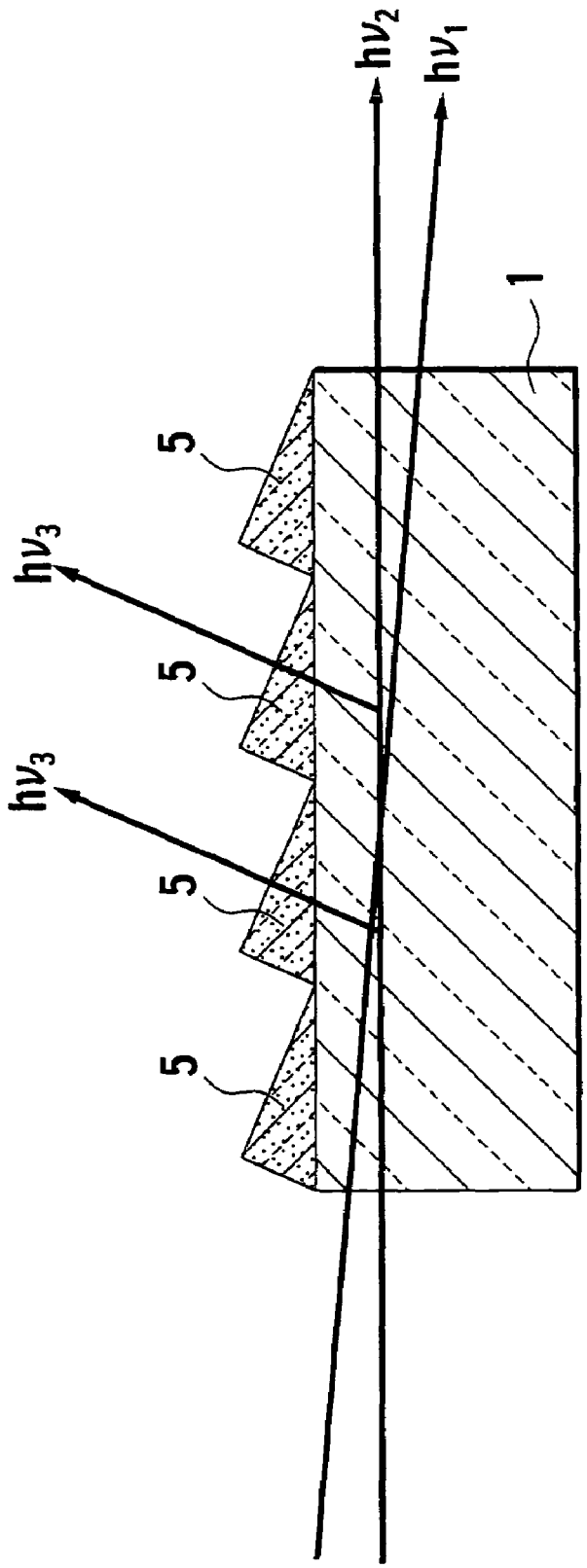
FIG. 1 illustrates an earlier electromagnetic wave generator at terahertz band.

Next, a first to eighth embodiments of the present invention is described with reference to the drawings. In the below description of the drawings, the same or similar reference numerals are applied to the same or similar parts, respectively. However, the drawings are represented schematically, and it will be appreciated that the relationships between the layer thickness and the planar size, the proportions of thickness of each layer are different from the real configuration.

In addition, the first to eighth embodiments represent examples of devices and methods to realize the technical idea of the present invention, and the technical idea of this invention is not limited to the materials of the constituent components, the geometry, the structure, the arrangement disclosed in the following discussion. Therefore, the technical idea of the present invention can be given various kinds of changes within the scope of claims.

In electromagnetic wave generators according to the first to eighth embodiments of the present invention, a case when a GaP crystal is employed as the nonlinear optical crystal for generating the terahertz electromagnetic waves is mainly described. We have already reported that Raman scattering efficiency in a GaP crystal is higher than that in a $LiNbO_3$ crystal. Moreover, in a GaP crystal, because the pure vibrational frequency of the transverse wave implementing phonon-polariton is extremely high of 11 THz, the polariton mode with a wide frequency band is obtained. Also, it is known that the absorption coefficient of GaP crystal in terahertz band is smaller than that in a $LiNbO_3$ crystal. In a wavelength range of the two pump beams $hv_1$ and $hv_2$ smaller than approximately one micrometer, a phase matching relationship between the difference-frequency beam and the nonlinear polarization is obtained in a parallel direction (collinear) configuration. However, the nonlinear optical crystal is not limited to a GaP crystal, but any semiconductor crystal or any dielectric crystal, which is transparent in terahertz band and has a high Raman scattering efficiency such as $ZnGeP_2$ crystal or GeSe crystal, can be available for the nonlinear optical crystal. In a GaP crystal, the phase matching is performed by the control of angles, in a nonlinear optical crystal such as $ZnGeP_2$ crystal or GeSe crystal, because a collinear phase matching can be performed using optically anisotropic behavior in the crystal, an extremely low cost frequency-tunable terahertz electromagnetic wave generator can be obtained.

Except for a case using the optical anisotropic crystal, in the following electromagnetic wave generators according to the first to eighth embodiments of the present invention, contrary to the wavelength range satisfying the collinear phase matching condition, wavelengths of the two pump beams $hv_1$ and $hv_2$ are increased to be larger one micrometer. As a result, although the phase matching in parallel direction cannot be achieved, angle phase matching can be achieved with a small intersection angle between the two pump beams $h\nu_1$ and $h\nu_2$. In a LiNbO$_3$ crystal, although angle phase matching is implemented, because a large intersection angle must be provided, the two pump beams $h\nu_1$, $h\nu_2$ and the terahertz electromagnetic wave $h\nu_3$ overlap poorly, the efficiency is low. By using GaP crystal as the nonlinear optical crystal, if the wavelength of the pump beam is slightly longer than one micrometer, because the phase matching angle becomes so small, such disadvantages can be overcome so as to achieve an effectiveness of increasing the frequency band. In order to sweep frequency of the terahertz electromagnetic wave, the rotation angle of a mirror or a beam splitter, which is closely disposed to the nonlinear optical crystal, is changed slightly and frequency of a second pump beam (signal beam) is swept simultaneously. Because a precise control of the small intersection angle is easily achieved with a rotation stage, the precision control of the terahertz frequency can be provided.

In a case that GaP crystal is used as the nonlinear optical crystal, the concept of a small angle matching with phonon-polariton is described with reference to FIG. 2. In the below-described development of equations, with wave-number vector $k_L$ of the phonon-polariton serving as the source of a first pump beam $h\nu_1$, wave-number vector $k_S$ of the phonon-polariton serving as the source of a second pump beam $h\nu_2$, and wave-number vector $q$ of the phonon-polariton serving as the source of a terahertz electromagnetic wave $h\nu_3$, frequencies $v_1$, $v_2$ and $v_3$ are defined for the first pump beam $h\nu_1$, the second pump beam $h\nu_2$, and the terahertz electromagnetic wave $h\nu_3$, respectively.

For the nonlinear optical crystal, if the wavelengths of the pump beams $h\nu_1$ and $h\nu_2$ are less than one micrometer, phase matching ($\Delta q = 0$) is obtained in parallel direction but a phase mismatching $\Delta q$ is generated in wavelengths longer than one micrometer. With $n_1$ being the refractive index of the nonlinear optical crystal at frequency of terahertz electromagnetic wave $h\nu_3$ and $n_L$ being the refractive index of the nonlinear optical crystal at frequencies of the pump beams $h\nu_1$ and $h\nu_2$, when the internal intersection angle $\Theta_{in}$ in the crystals is small enough, the following equation is obtained from the geometrical relationship of wave-number vectors of FIG. 2:

$$\Theta_{in} = (2\Delta q/q)^{1/2}(n_1/n_L)(v_3/v_2). \qquad (1)$$

However, $\Delta q$ is amount of mismatch between wave-numbers generated by the fact that the phase matching is impossible in parallel direction, because wavelengths of the pump beams $h\nu_1$ and $h\nu_2$ are increased larger than one micrometer, and:

$$\Delta q = k_L - k_S - q. \qquad (2)$$

For the phase matching in parallel direction, approximately one micrometer is calculated as the limit wavelength, and it is confirmed that the limit frequency is very close to one micrometer experimentally. When wavelengths of the pump beams $h\nu_1$ and $h\nu_2$ are set to be the wavelength of 1.064 micrometers from YAG laser, the wavelength of YAG laser is 6.4% longer than limit wavelength, a degree of phase mismatching $\Delta q/q$ is calculated to be approximately 3% from dispersion relationship of the terahertz electromagnetic waves. Therefore, from Eq. (1), the internal intersection angle $\Theta_{in}$ is calculated to be small value of 3.2' (minute)=0.054°, when $v_3$=1 THz.

Figure 2:
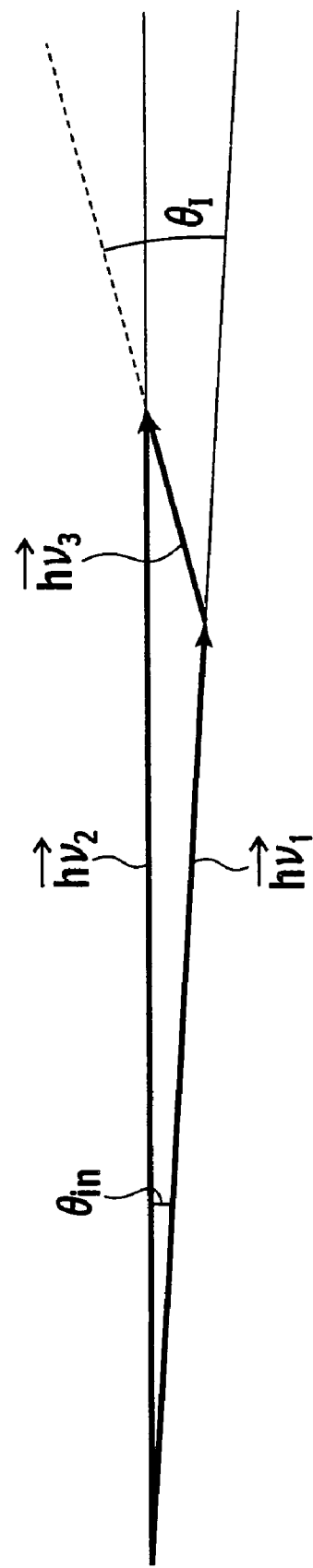
FIG. 2 illustrates wave-number vector directions of a first pump beam, a second pump beam and a terahertz electromagnetic wave in electromagnetic wave generators, pertaining to first to eighth embodiments of the present invention, respectively.

On the other hand, for propagation direction (exit angle) $\Theta_I$ of the terahertz electromagnetic wave, the following equation is obtained from FIG. 2:

$$\sin \Theta_I = k_s/q \sin \Theta_i. \qquad (3)$$

Moreover, the following equation is obtained from Eqs. (1) and (3):

$$\sin \Theta_I = (2\Theta q/q)^{1/2} \qquad (4)$$

Figure 3:
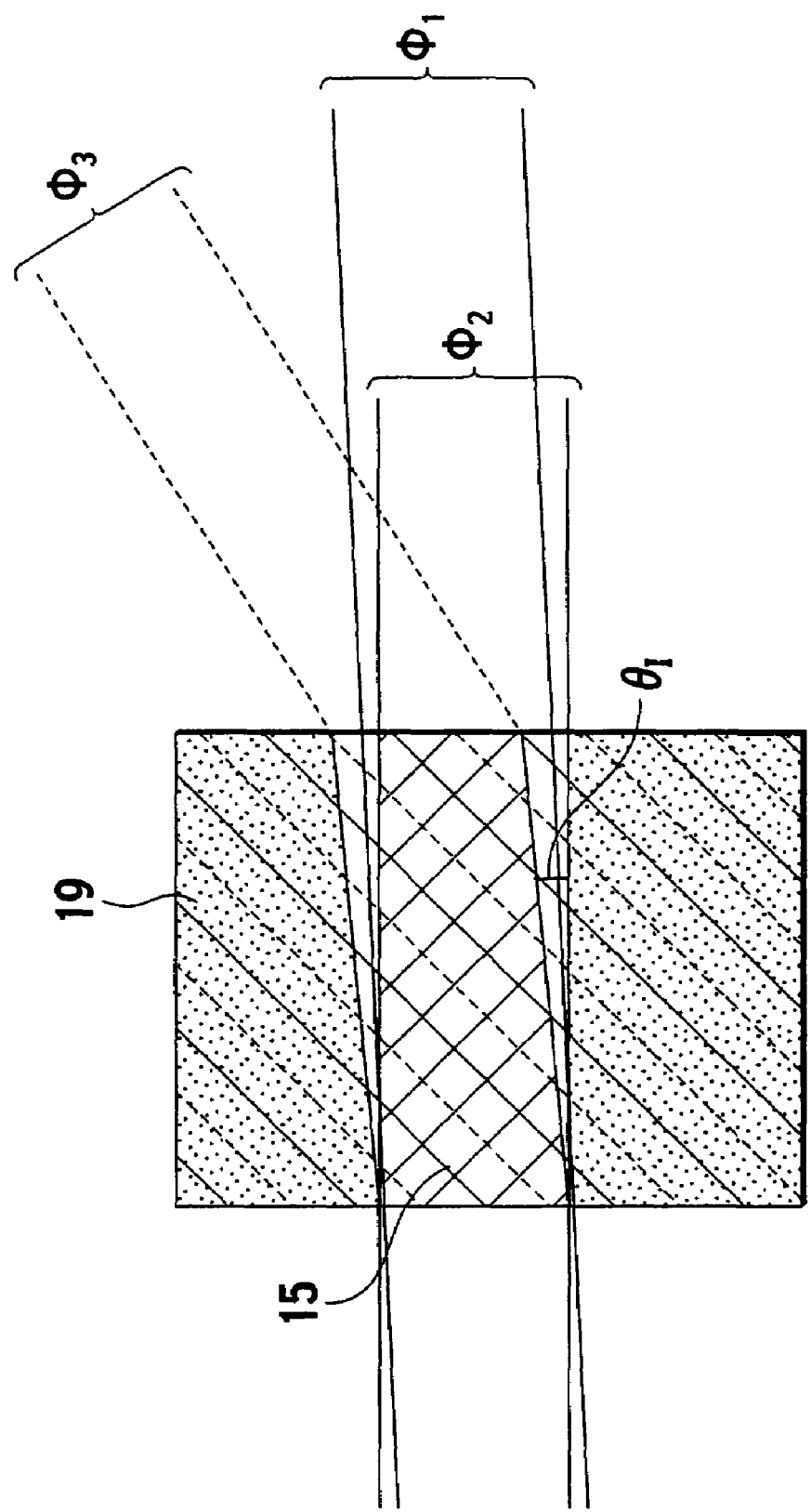
FIG. 3 illustrates propagation optical paths of the first pump beam, the second pump beam and the terahertz electromagnetic wave in a crystal implementing the electromagnetic wave generator, according to the first embodiment of the present invention.

In other words, because of the exit angle $\Theta_I$ is multiplied by $k_s/q$, the exit angle $\Theta_I$ is much larger than the internal intersection angle $\Theta_{in}$, from 0.5 THz to 4 THz, the exit angle $\Theta_I$ is approximately from 10° to 14°. Because of tan 14°=0.25, since the overlap of optical path $\Phi_3$ of the terahertz electromagnetic wave $h\nu_3$ with optical paths $\Phi_1$ and $\Phi_2$ of the pump beams $h\nu_1$ and $h\nu_2$, as shown in FIG. 3, becomes approximately more than 80%, and an effective interaction distance becomes closed to the crystal length, a high output is obtained in a wide range of frequencies.

As frequency of $v_2$ of the terahertz electromagnetic wave $h\nu_3$ increases to 7 THz, dispersion of terahertz electromagnetic wave $h\nu_3$ becomes large so as to increase $2\Delta q/q$. According to calculation of dispersion characteristics, although $2\Delta q/q$ increases up to $\Delta q/q$=12% at 7 THz, in this situation, $\Delta q$ is still in a range to be considered as small value. Therefore, the internal intersection angle $\Theta_I$=46' (minute) is calculated from Eq. (1), and which is a small angle of less than 1°. The angle at the outside of crystal is approximately 142', in other words, 2.4°. When direction of the terahertz electromagnetic wave $h\nu_3$ and exit angle $\Theta_I$ is approximately 30° from Eq. (4), as shown in FIG. 3 for a beam diameter of 3 mm and a crystal length of 5 mm, the beam overlap of more than approximately 50% can be obtained. Therefore, effective-decrease of the efficiency is not so significant at 7 THz. However, the terahertz electromagnetic wave $h\nu_3$ cannot be extracted from the exit face ascribable to total internal reflection, because the exit angle $\Theta_I$ exceeds 17°, which is a critical angle for the total internal reflection in the crystal, if the incident angle is close to a perpendicular incident angle, as shown in FIG. 3. In this situation, if the incident angle of the pump beam is tilted to be larger than 13°, not 0°, the critical angle can be set to be less than 17°.

However, when using optical anisotropic crystals such as ZnGeP$_2$ crystal and GaSe crystal as the nonlinear optical crystal 19, because the collinear phase matching using crystal anisotropy can be established, it is not required to consider the restriction of the internal intersection angle $\Theta_{in}$ as prescribed by Eq. (1). In other words, for the case when using the optical anisotropic crystal as the nonlinear optical crystal, with the pump beam $h\nu_1$ and $h\nu_2$ incident in parallel (the internal intersection angle $\Theta_{in}$=0°), by rotating crystal direction of the optical anisotropic crystal, the phase matching can be conducted.

First Embodiment

Figure 4:
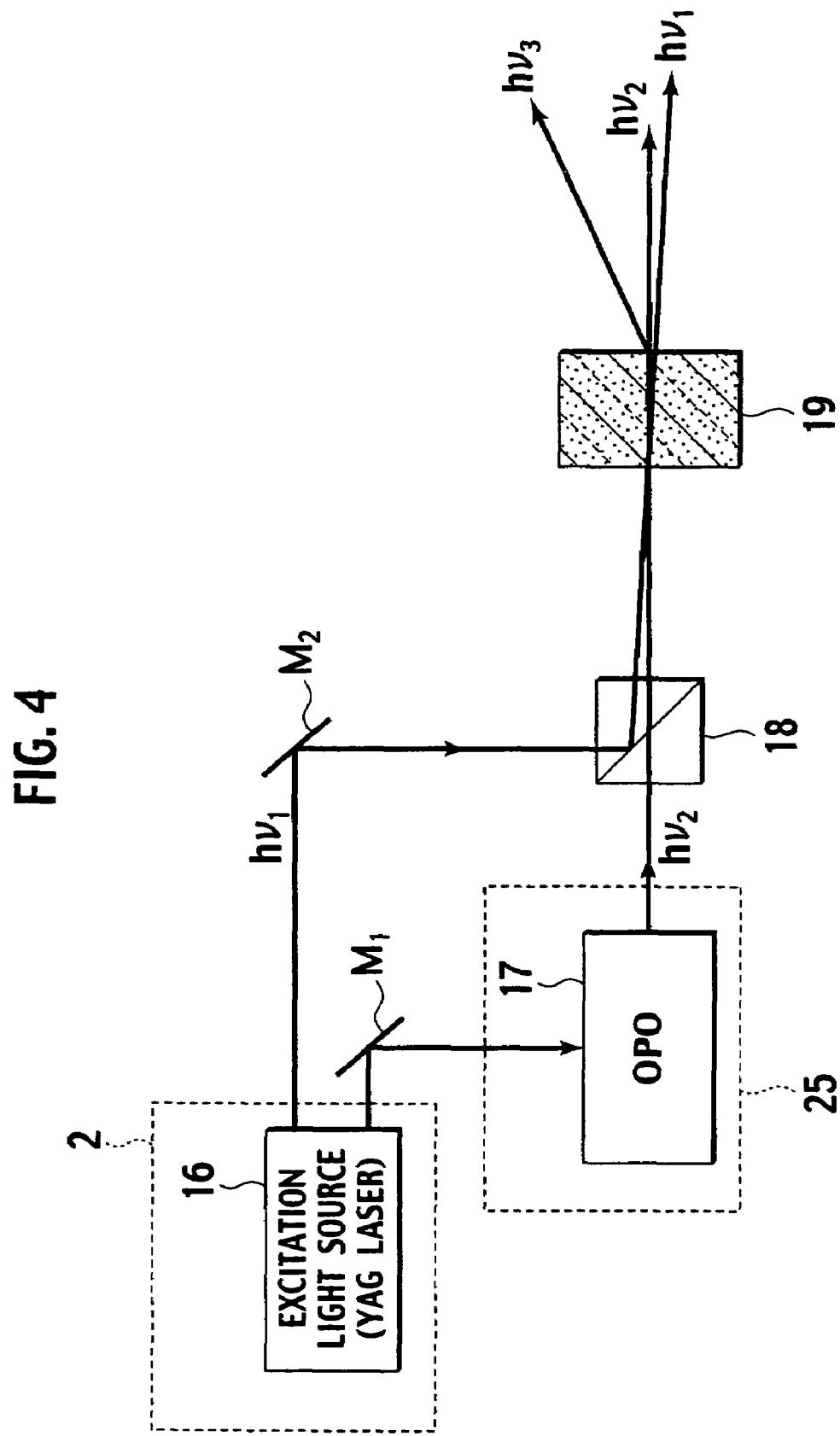
FIG. 4 illustrates an organization of the electromagnetic wave generator according to the first embodiment of the present invention.

As shown in FIG. 4, an electromagnetic generator according to a first embodiment of the present invention encompasses a first pump beam emitter 2 configured to emit a first pump beam $h\nu_1$ at wavelength longer than one micrometer, a second pump beam emitter 25 configured to emit a second pump beam $h\nu_2$ at tunable-wavelength that is different from that of the first pump beam $h\nu_1$, being longer than one micrometer, a nonlinear optical crystal 19 configured to generate an electromagnetic wave $h\nu_3$ of difference-frequency between the first pump beam $h\nu_1$ and the second pump beam $h\nu_2$, and an optical system (M$_1$, M$_2$, 18) configured to irradiate the first pump beam and the second pump beam to the optical crystal 19, adjusting an external intersection angle $\Theta_{in}^{ext}$ to be less than 0.5° at difference-frequency $v_3$=1 THz between the first pump beam $h\nu_1$ and the second pump beam $h\nu_2$. Here, the external intersection angle $\Theta_{in}^{ext}$ is an intersection angle between the first pump beam and the second pump beam measure at outside of the crystal, and has an approximate relationship with the internal intersection angle $\Theta_{in}$, such as:

$$\Theta_{in}^{ext} = n_L \Theta_{in}. \tag{5}$$

Because $n_L$ is a refractive index of the nonlinear optical crystal 19 at pump beam frequency, in a case when the nonlinear optical crystal 19 is GaP crystal, the refractive index is about $n_L = 3.1$.

According to Eq. (1), the external intersection angle $\Theta_{in}^{ext}$ increases proportional to difference-frequency $v_3$ in a frequency range sufficiently lower than the transverse phonon frequency in the nonlinear optical crystal. When the difference-frequency $v_3$ becomes closer to the transverse phonon frequency, the external intersection angle $\Theta_{in}^{ext}$ starts to deviate from the proportional relationship prescribed by Eq. (1), and changes along a curved line indicating frequency dispersion, as shown in FIG. 5.

Figure 5:
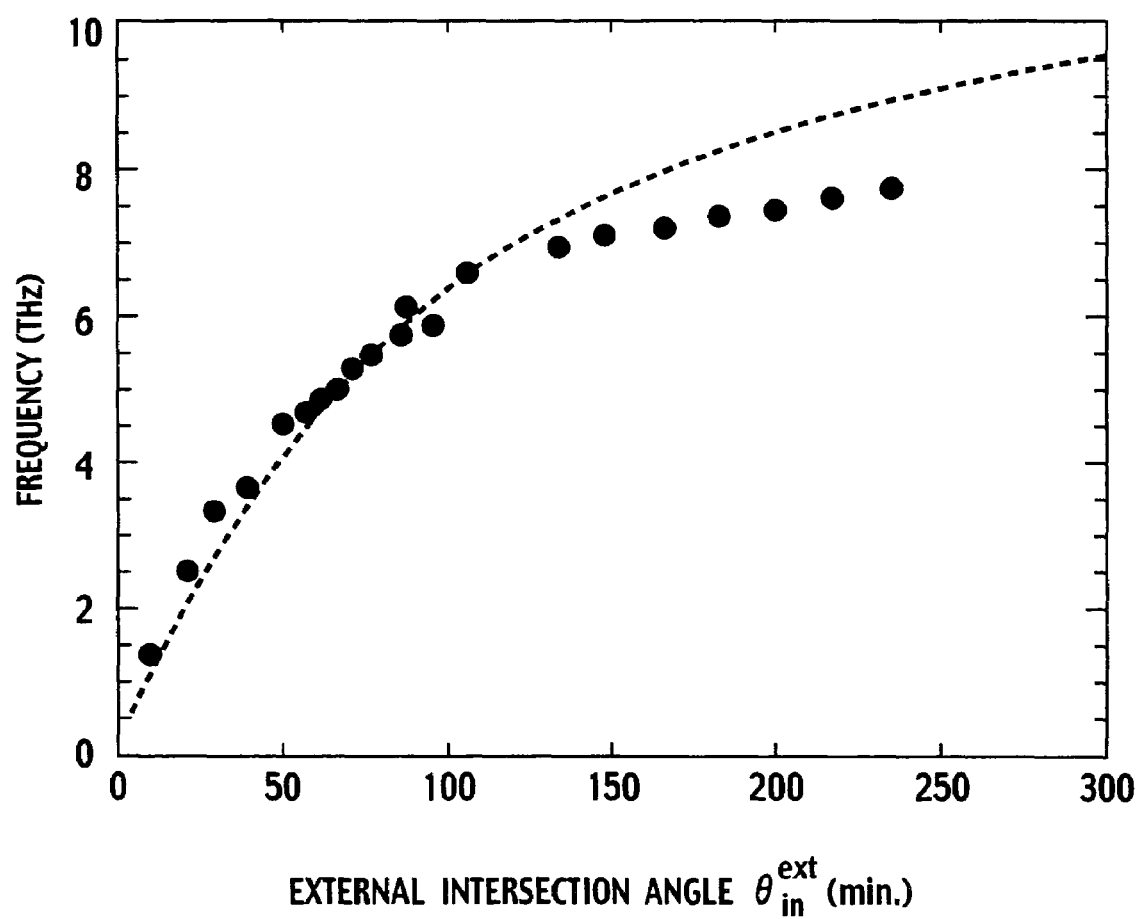
FIG. 5 illustrates frequency-dependent characteristics of the external intersection angle in a case when a GaP crystal is employed as a nonlinear optical crystal.

Although FIG. 5 illustrates a dependence of the external intersection angles $\Theta_{in}^{ext}$ on the difference-frequencies $v_3$, in a case when a GaP crystal is employed as the nonlinear optical crystal, the actual measured values illustrated by the closed circles become smaller than the values of the external intersection angles $\Theta_{in}^{ext}$, which are calculated from Eq. (1), in a low frequency side. For example, when difference-frequency $v_3$ is 1 THz, a small external intersection angle $\Theta_{in}^{ext} = 5' = 0.083°$ and a small internal intersection angle $\Theta_{in} = 1.6' = 0.027°$ are established. When difference-frequency $v_3$ is 2 THz, a small external intersection angle $\Theta_{in}^{ext} = 17' = 0.28°$ and a small internal intersection angle $\Theta_{in} = 5.5' = 0.09°$ are established. When difference-frequency $v_3$ is 6 THz, a small external intersection angle $\Theta_{in}^{ext} = 100' = 1.7°$ and a small internal intersection angle $\Theta_{in} = 32' = 0.55°$ are established. When difference-frequency $v_3$ is 7 THz, a small external intersection angle is $\Theta_{in}^{ext} = 180' = 3°$ and a small internal intersection angle $\Theta_{in} = 57.8' = 0.96°$ are established.

On the contrary, for the LiNbO$_3$ crystal as explained at the beginning, with reference to FIG. 1, when difference-frequency $v_3$ is 1 THz, the external intersection angle $\Theta_{in}^{ext}$ becomes as $\Theta_{in}^{ext} = 0.95°$ (internal intersection angle $\Theta_{in} = 0.44°$), when difference-frequency $v_3$ is 2 THz, the external intersection angle $\Theta_{in}^{ext}$ becomes as $\Theta_{in}^{ext} = 1.85°$ (the internal intersection angle $\Theta_{in} = 0.86°$), which are much larger than those angles in the GaP crystal. Although, hereinafter, the embodiments will be explained mainly with the external intersection angles $\Theta_{in}^{ext}$, which are subject to direct-control, it is sure that the external intersection angle $\Theta_{in}^{ext}$ can be converted easily to an equivalent internal intersection angle $\Theta_{in}$ from Eq. (5).

An optical system ($M_1$, $M_2$, 18) configured to irradiate the first and second pump beams to the nonlinear optical crystal, adjusting the external intersection angle $\Theta_{in}^{ext}$, embraces a first mirror $M_1$, a second mirror $M_2$ and a polarization beam splitter 18. The first mirror $M_1$ is a mirror configured to irradiate the first pump beam $hv_1$ to the second pump beam emitter 25 by reflecting the first pump beam $hv_1$ which is emitted from the first pump beam emitter 2. The second mirror $M_2$ is a rotatable mirror so as to adjust an incident angle of the first pump beam $hv_1$ to the polarization beam splitter 18, by reflecting the first pump beam $hv_1$ emitted from the first pump beam emitter 2. According to the configuration of the optical system ($M_1$, $M_2$, 18) shown in FIG. 4, the signal beam (second pump beam) emitted from the second pump beam emitter 25, is forced to transmit through the polarization beam splitter 18. Also, the pump beam (first pump beam) $hv_1$ emitted from the first pump beam emitter 2 is reflected by a polarization surface of the polarization beam splitter 18, on which the pump beam (first pump beam) $hv_1$ incident at a right angle direction through the second mirror $M_2$, so as to implement an optical system configured to couple the pump beam (first pump beam) $hv_1$ with the signal beam (second pump beam) $hv_2$ in the nonlinear optical crystal 19 in almost parallel, establishing a small external intersection angle $\Theta_{in}^{ext}$.

Figure 9:
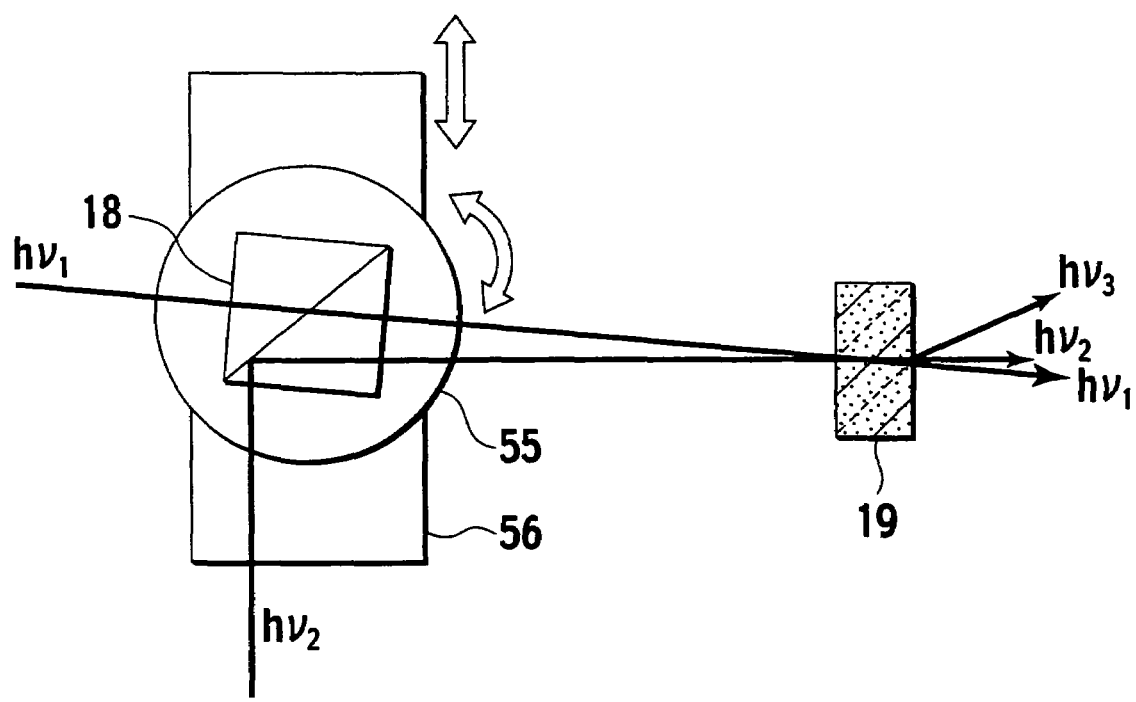
FIG. 9 illustrates a control method of external intersection angle between the pump beams in an electromagnetic wave generator of the fourth embodiment of the present invention.

Because it is enough that the pump beam (first pump beam) $hv_1$ and the signal beam (second pump beam) $hv_2$ overlap each other in approximately parallel configuration by the polarization beam splitter 18, as shown in FIG. 9 of a fourth embodiment, while forcing the pump beam (first pump beam) $hv_1$ to transmit through the polarization beam splitter 18, by irradiating the signal beam (second pump beam) $hv_2$, having a polarization plane orthogonal to the pump beam (first pump beam) $hv_1$, from a perpendicular direction so as to be reflected by the polarization surface of the polarization beam splitter 18, an optical system configured to couple the pump beam (first pump beam) $hv_1$ and the signal beam (second pump beam) $hv_2$ in the nonlinear optical crystal 19 in the almost parallel configuration, establishing the small external intersection angle $\Theta_{in}^{ext}$, can be implemented. Then, with a change of frequency of the second pump beam $hv_2$, the optical system ($M_1$, $M_2$, 18) is driven simultaneously with the change of the external intersection angle $\Theta_{in}^{ext}$ between the first pump beam $hv_1$ and the second pump beam $hv_2$ so as to generate a frequency-tunable terahertz electromagnetic wave $hv_3$ from the nonlinear optical crystal 19.

Because the optical system ($M_1$, $M_2$, 18) shown in FIG. 4 is an example, the optical system may be added with another optical element such as a mirror, in addition to the first mirror $M_1$, the second mirror $M_2$ and the polarization beam splitter 18, or alternatively, the optical system may be implemented by another optical element such as a prism, replacing the first mirror $M_1$ or the second mirror $M_2$, which can establish the equivalent behavior of the first mirror $M_1$ or the second mirror $M_2$. With addition or replacement of such another optical element, the optical system can irradiate the first and second pump beams into the nonlinear optical crystal 19, by adjusting the external intersection angle $\Theta_{in}^{ext}$.

Specifically, a YAG laser 16 is used as the first pump beam emitter 2 oscillated with pulses at wavelength of 1.064 micrometers. A wavelength-tunable optical parametric oscillator (OPO) 17 is used as a second pump beam emitter 25. The wavelength-tunable OPO 17 is pumped with 355 nm light, which has a triple frequency of the fundamental wave of the pump beam (first pump beam) $hv_1$ from the YAG laser as an excitation light source 16.

The wavelength-tunable OPO 17 encompasses an injection seeding mechanism (means) so as to narrow the spectrum linewidth of the terahertz electromagnetic wave $hv_3$ and to operate without mode-hop in a wide frequency range. A seed laser (a master oscillator) is installed inside the wavelength-tunable OPO 17 so as to implement the injection seeding mechanism (means). In the seed laser (master oscillator), for example, a narrow spectrum width can be achieved with a high Q value cavity for barium borate (BaB$_2$O$_4$) crystal. In other words, both the seed laser (master oscillator) and slave laser (host laser) use parametric effect in the BaB$_2$O$_4$ crystal. Then, the length of the cavity of the wavelength-tunable OPO 17, which serves as the slave laser (host laser), is controlled so that the longitudinal mode of the seed laser can agree with the longitudinal mode of slave laser.

For achieving "cavity locking" configured to control the cavity length of the slave laser, it is necessary to control the cavity length precisely with at least more than an order of:

(wavelength)/(cavity finess)

for example, it is preferable to control the cavity length by a piezo driver. Therefore, the output of the wavelength-tunable OPO 17 is detected by a photo director, and the output signal from the photo director is fed into a lock-in-amplifier via a blanking circuit. Moreover, the output signal of the lock-in-an amplifier is added with a modulation signal from a functional generator, and is converted to a piezo-driving voltage by the piezo driver so as to drive the modulation mirror. In this case, a tuning signal from the function generator may be used as a reference signal for a lock-in-amplifier. With such wavelength-tunable OPO 17, because the wavelength degeneration causing a widening of the spectrum linewidth can be suppressed, if it is excited by the third-harmonic wave of the excitation light source (YAG laser) 16, in other words, if it is excited by the beam at wavelength of 355 nm, and because the spectrum linewidth of the wavelength-tunable OPO 17 can be narrowed by the injection seeding, the spectrum linewidth of the terahertz electromagnetic wave $hv_3$, generated as difference-frequency, becomes narrow.

When the wavelength of output beam from the wavelength-tunable OPO 17 is elected to be in a range from 1.038 micrometers to 1.0635 micrometers, the difference-frequency $v_3$ will be in a range of 0.15 THz to 7 THz. And it is preferable to elect a wavelength of the wavelength-tunable OPO 17 to a range of 1.0646 micrometers to 1.091 micrometers.

Similarly, the excitation light source (YAG laser) 16 is preferable to be implemented by an excitation light source with narrow linewidth, using a high Q cavity YAG laser as the seed laser (master oscillator) so as to narrow the spectrum linewidth, by conducting the injection seeding The pump beam (first pump beam) $hv_1$ and the signal beam (second pump beam) $hv_2$, having mutually orthogonal polarization directions, overlap almost in parallel with a small external intersection angle $\Theta_{in}^{ext}$ by the polarization beam splitter 18. The beam directions of the pump beam (first pump beam) $hv_1$ or signal beam (second pump beam) $hv_2$ is adjusted in order to establish an extremely small external intersection angle $\Theta_{in}^{ext}$, depending on the frequency of the terahertz electromagnetic wave $hv_3$ by rotating slightly the beam splitter 18 or the second mirror $M_2$.

In a case when a GaP crystal is employed as the nonlinear optical crystal 19, if the optical axis direction of the GaP crystal is set to be [110] direction, the terahertz electromagnetic wave $hv_3$, the pump beam (first pump beam) $hv_1$ and signal beam (second pump beam) $hv_2$ can emit from the exit face of the nonlinear optical crystal 19. Since the exit angle $\Theta_f$ is approximately 10-17° for the terahertz electromagnetic wave $hv_3$ lying in a range from 0.15 THz to 5 THz, and for the terahertz electromagnetic wave $hv_3$ at 7 THz, the exit angle $\Theta_f$ is still less than 30°, the overlap among the pump beam (first pump beam) $hv_1$, the signal beam (second pump beam) $hv_2$ and the terahertz electromagnetic wave $hv_3$ become large, and then a long distance interaction can be conducted. Therefore, the pulsed output of the terahertz electromagnetic wave $hv_3$ of more than 100 milliwatts is obtained in a wide range of 0.15-7 THz.

As described in following forth and fifth embodiments, with an automatic-phase-matching control system (a computer system) configured to control the external intersection angle $\Theta_{in}^{ext}$ between two pump beams $hv_1$ and $hv_2$ automatically, by conducting a computer control such that the wavelength of the wavelength-tunable OPO 17 is swept automatically by a wavelength controller, a rotation stage mounting the polarization beam splitter 18 is rotated and the position of a linear stage mounting the beam splitter is moved, being linked with the operation of the wavelength controller, the maximum output can be generated from the nonlinear optical crystal 19 at every frequency $v_3$.

Because the spectrum linewidth of the excitation light source (YAG laser) 16 as the first pump beam emitter 2 is sufficiently narrow, the spectrum linewidth of terahertz electromagnetic wave $hv_3$ as the difference-frequency depends on the spectrum linewidth of OPO 17, which serves as the second pump beam emitter 25. Because OPO 17 is controlled by the injection seeding, the spectrum linewidth is approximately 4 GHz, and the spectrum linewidth of terahertz electromagnetic wave $hv_3$ as difference-frequency is also almost 4 GHz. Because the spectrum linewidths of solid and liquid substance are generally more than 50 GHz in terahertz band, the electromagnetic generator according to the first embodiment of the present invention facilitates the spectroscopic measurement with sufficiently high resolution.

Second Embodiment

Figure 6:
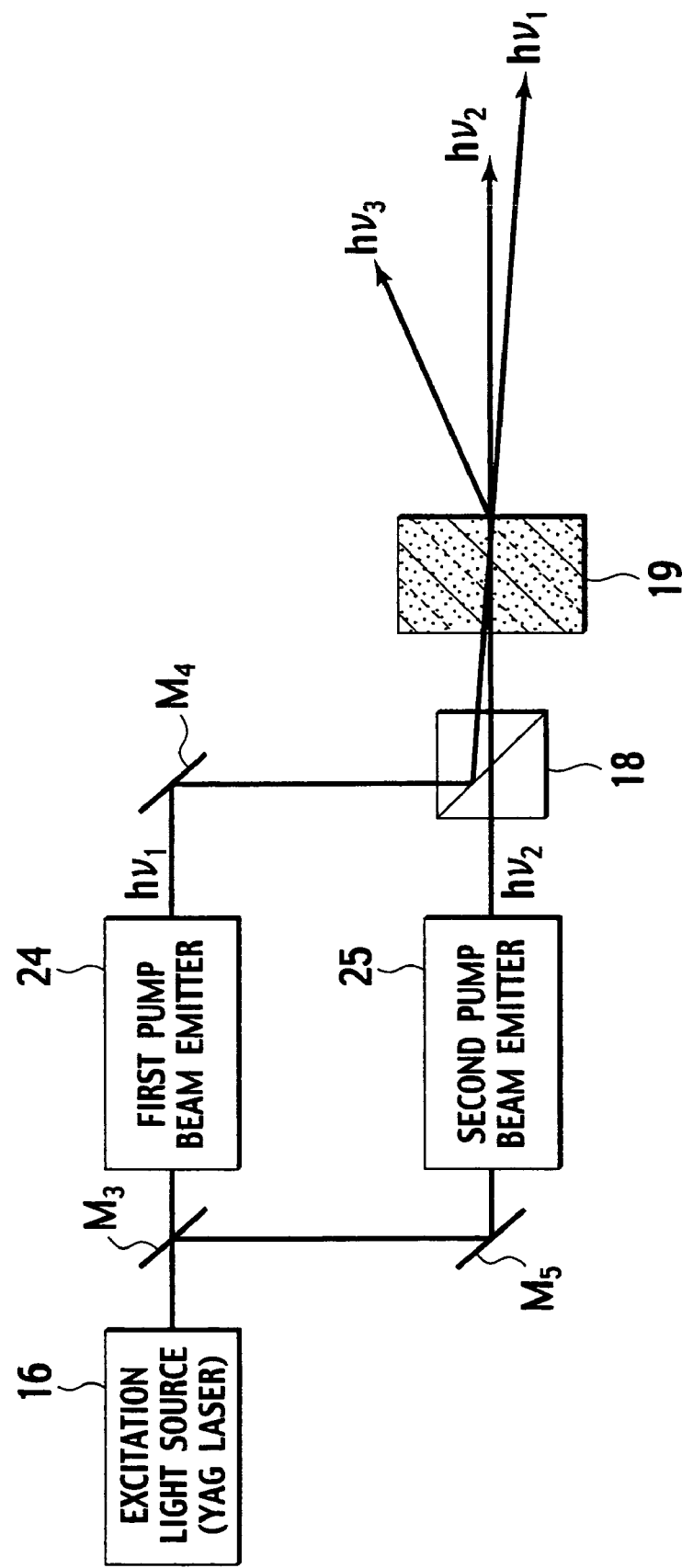
FIG. 6 illustrates an organization of an electromagnetic wave generator, according to a second embodiment of the present invention.

As shown in FIG. 6, an electromagnetic generator according to a second embodiment of the present invention encompasses a first pump beam emitter 24 configured to emit a first pump beam $hv_1$ at wavelength longer than one micrometer, a second pump beam emitter 25 configured to emit a second pump beam $hv_2$ at tunable-wavelength that is different from that of the first pump beam $hv_1$, being longer than one micrometer, a nonlinear optical crystal 19 configured to generate an electromagnetic wave $hv_3$ of difference-frequency between the first pump beam $hv_1$ and the second pump beam $hv_2$, and an optical system ($M_3$, $M_4$, $M_5$, 18) configured to irradiate the first pump beam and the second pump beam to the optical crystal 19, adjusting an external intersection angle $\Theta_{in}^{ext}$ to be less than 0.5° at difference-frequency $v_3$=1 THz between the first pump beam $hv_1$ and the second pump beam $hv_2$.

The optical system ($M_3$, $M_4$, $M_5$, 18) embraces a half mirror $M_3$, a first mirror $M_4$, a second mirror $M_5$ and a polarization beam splitter 18. The half mirror $M_3$ is a mirror configured to transmit a portion of the excitation beam, emitted from YAG laser as the excitation light source 16, so as to irradiate the excitation beam into the first pump beam emitter 24, and to reflect other portion of the excitation beam, emitted from the excitation light source (YAG laser) 16, so as to irradiate into the second pump beam emitter 25. A first mirror $M_4$ is a mirror configured to irradiate other portions of the excitation beam from the excitation light source 16 to the second pump beam emitter 25 by further reflecting the excitation beam, which has been reflected by the half mirror $M_3$. A second mirror $M_5$ is a rotatable mirror so as to adjust an incident angle of the first pump beam $hv_1$ to the polarization beam splitter 18, by reflecting the first pump beam $hv_1$ emitted from the first pump beam emitter 24.

According to the configuration of the optical system ($M_3$, $M_4$, $M_5$, 18) shown in FIG. 6, the signal beam (second pump beam) emitted from the second pump beam emitter 25, is forced to transmit through the polarization beam splitter 18. Also, the pump beam (first pump beam) $hv_1$ emitted from the first pump beam emitter 24 is reflected by a polarization surface of the polarization beam splitter 18, on which the pump beam (first pump beam) $hv_1$ incident at a right angle direction through the second mirror $M_4$, so as to implement an optical system configured to couple the pump beam (first pump beam) $h\nu_1$ with the signal beam (second pump beam) $h\nu_2$ in the nonlinear optical crystal 19 in almost parallel, establishing a small external intersection angle $\Theta_{in}^{ext}$.

Because it is enough that the pump beam (first pump beam) $h\nu_1$ and the signal beam (second pump beam) $h\nu_2$ overlap each other in approximately parallel configuration by the polarization beam splitter 18, as shown in FIG. 9 of a fourth embodiment, while forcing the pump beam (first pump beam) $h\nu_1$ to transmit through the polarization beam splitter 18, by irradiating the signal beam (second pump beam) $h\nu_2$, having a polarization plane orthogonal to the pump beam (first pump beam) $h\nu_1$, from a perpendicular direction so as to be reflected by the polarization surface of the polarization beam splitter 18, an optical system configured to couple the pump beam (first pump beam) $h\nu_1$ and the signal beam (second pump beam) $h\nu_2$ in the nonlinear optical crystal 19 in the almost parallel configuration, establishing the small external intersection angle $\Theta_{in}^{ext}$, can be implemented. Then, with a change of frequency of the second pump beam $h\nu_2$, the optical system ($M_3$, $M_4$, $M_5$, 18) is driven simultaneously with the change of the external intersection angle $\Theta_{in}^{ext}$ between the first pump beam $h\nu_1$ and the second pump beam $h\nu_2$ so as to generate a frequency-tunable terahertz electromagnetic wave $h\nu_3$ from the nonlinear optical crystal 19.

Because the optical system ($M_3$, $M_4$, $M_5$, 18) shown in FIG. 6 is an example, the optical system may be added with another optical element such as a mirror, in addition to the half mirror $M_3$, the first mirror $M_5$, the second mirror $M_4$ and the polarization beam splitter 18, or alternatively, the optical system may be implemented by another optical element such as a prism, replacing the first mirror $M_5$ or the second mirror $M_4$, which can establish the equivalent behavior of the first mirror $M_5$ or the second mirror $M_4$.

Chromium (Cr) doped forsterite lasers are employed as the first and second pump sources, which are installed in the first pump beam emitter 24 and the second pump beam emitter 25, respectively, which are pumped by the excitation light source (YAG laser) 16. Because the Cr-doped forsterite laser uses level of chromium in forsterite ($SiO_2.2MgO=Mg_2SiO_4$), which is the main composition of Olivine, the spectrum linewidth is extremely narrow than OPO without injection seeding. As Cr-doped forsterite laser is pumped by the excitation light source at wavelength of 1.064 micrometers and efficiency is high, because the third harmonic of YAG is not used as the OPO.

Therefore, the electromagnetic wave generator according to the second embodiment can reduce the spectrum linewidth of the terahertz electromagnetic wave $h\nu_3$ as difference-frequency, without employing the injection seeding, using the first pump beam emitter 24 as fixed wavelength pump source and the second pump beam emitter 25 as wavelength-tunable pump source, with two Cr-doped forsterite lasers installed in the first pump beam emitter 24 and the second pump beam emitter 25, respectively, as the first and second pump sources.

The wavelength of the pump beam (first pump beam) $h\nu_1$, for example, is fixed at 1.20 micrometers. The first pump source, installed in the first pump beam emitter 24, can reduce the spectrum linewidth to be about 1 GHz at fixed wavelength, by incorporating etalon in the first pump source. The second pump source, which is installed in the second pump beam emitter 25, in which the same kind of Cr-doped forsterite laser as for the first pump source is incorporated, sweeps the wavelength. Due to the continuous wavelength sweeping in the second pump beam emitter 25, because the etalon is not incorporated in the second pump source, the spectrum linewidth of the second pump source is from 10 GHz to 15 GHz.

Moreover, because Cr-doped forsterite laser is not required to be excited by higher harmonic of YAG such as OPO, the Cr-doped forsterite laser can be excited by the fundamental wave of 1.064 micrometers, the features of the Cr-doped forsterite laser lie in high output power characteristics and a low manufacturing cost.

Therefore, the spectrum linewidth of the terahertz electromagnetic wave $h\nu_3$, being generated as difference-frequency, becomes to be approximately from 10 GHz to 15 GHz. By changing wavelength of the signal beam (second pump beam), which is emitted from Cr-doped forsterite laser in the second pump beam emitter 25, from 1.2024 micrometers to 1.2346 micrometers, the frequency range of the generated terahertz electromagnetic wave $h\nu_3$, similar to the electromagnetic wave generator according to the first embodiment, is also between 0.5 THz to 7 THz. The output power is also same as that of the electromagnetic wave generator according to the first embodiment.

As described in following forth and fifth embodiments, with an automatic-phase-matching control system (a computer system) configured to control the external intersection angle $\Theta_{in}^{ext}$ between two pump beams $h\nu_1$ and $h\nu_2$ automatically, by conducting a computer control such that the wavelength of the Cr-doped forsterite laser (second pump source) of the second pump beam emitter 25 is swept automatically by a wavelength controller, a rotation stage mounting the polarization beam splitter 18 is rotated and the position of a linear stage mounting the beam splitter is moved, being linked with the operation of the wavelength controller, the maximum output can be generated from the nonlinear optical crystal 19 at every frequency $\nu_3$.

When the pump beams $h\nu_1$ and $h\nu_2$ are beams from the Cr-doped forsterite laser at wavelength band of 1.255 micrometers, the external intersection angle $\Theta_{in}^{ext}$, which depends on difference-frequency $\nu_3$ as shown in FIG. 5, are approximately 12' at 1 THz and 24' at 2 THz, by the calculation with Eq. (1).

Moreover, it is possible to replace the Cr-doped forsterite lasers as the first and second pump sources embedded in the first pump beam emitter 24 and the second pump beam emitter 25, respectively, by yttrium-lithium-fluoride (YLF) lasers doped with ytterbium (Yb), or fiber lasers doped with Yb. A technical advantage of extremely low cost can be achieved by using the Yb-doped YLF lasers or by the Yb-doped fiber lasers, because relatively narrow linewidth can be obtained without using the injection seeding schemes. However, because the wavelength is slightly shorter than 1.064 micrometers of YAG laser, it is preferable to elect second harmonic (wavelength of 530 nm) of YAG laser for pumping Yb-doped YLF laser or Yb-doped fiber laser.

Third Embodiment

Figure 7:
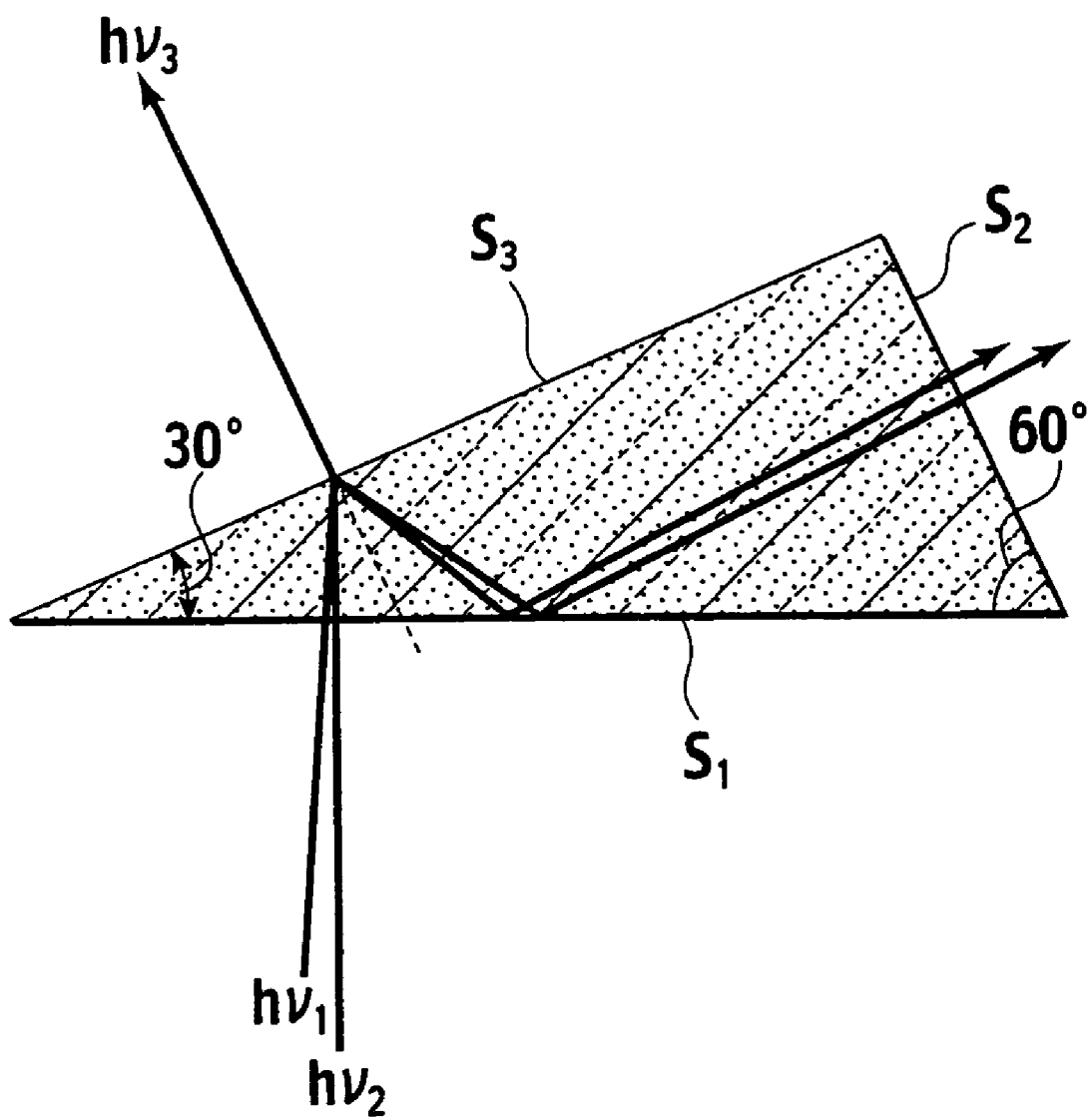
FIG. 7 illustrates the geometry of the nonlinear optical crystal and the beam direction in an electromagnetic wave generator, according to a third embodiment of the present invention.

Although electromagnetic wave generator according to the third embodiment has almost same organization of the electromagnetic wave generators explained in the first and second embodiments, geometry of the nonlinear optical crystal 19 in the third embodiment is different from those of the first and second embodiments, because the nonlinear optical crystal 19 is formed into a triangular prism, which has a cross section of a right triangle as shown in FIG. 7. The terahertz electromagnetic wave $h\nu_3$ will be emitted almost perpendicular to an electromagnetic wave exit face (outputting face) $S_3$, if the pump beams $h\nu_1$ and $h\nu_2$ enter into an entrance face $S_1$ defined by the hypotenuse (the longest side of the right triangle), by shaping the geometry of the nonlinear optical crystal 19 into the right triangle with an angle of approximately 30° and an angle of approximately 60° in a cross sectional view shown in FIG. 7.

For example, in a case when frequency $v_3$ of the terahertz electromagnetic wave $hv_3$ is 7 THz, although a propagation direction $\Theta_T$ of the terahertz electromagnetic wave $hv_3$ is almost 30°, because the terahertz electromagnetic wave $hv_3$ is emitted almost perpendicular to the electromagnetic wave exit face (outputting face) $S_3$, the configuration of the detection optical system of the terahertz electromagnetic wave $hv_3$ becomes simple and easy so that, even if the crystal orientation is displaced by 1-2° a significant problem will not be caused. On the other hand, the pump beam is reflected by the total internal reflection at the electromagnetic wave exit face (outputting face) $S_3$, but is emitted from a face $S_2$.

As described above, the electromagnetic wave generator according to the third embodiment differs from the electromagnetic wave generators according to the first and second embodiments, in that, even the frequency of the electromagnetic wave $hv_3$ becomes higher than 7 THz, the terahertz electromagnetic wave $hv_3$ can be extracted, without being reflected by the total internal reflection.

Fourth Embodiment

Figure 8:
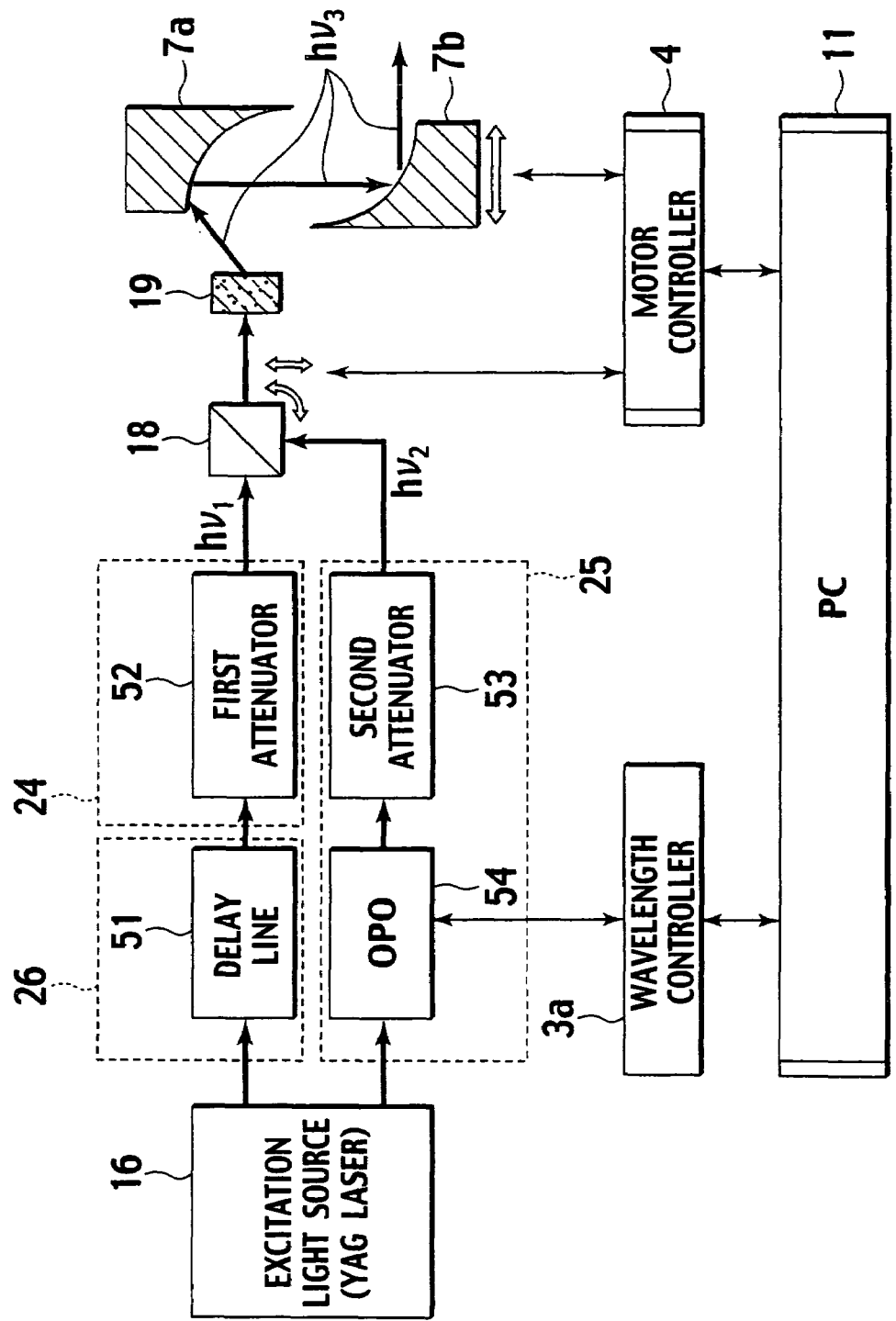
FIG. 8 illustrates an organization of an electromagnetic wave generator, according to a fourth embodiment of the present invention.

As shown in FIG. 8, an electromagnetic generator according to a fourth embodiment of the present invention encompasses a first pump beam emitter 24 configured to emit a first pump beam $hv_1$, a second pump beam emitter 25 configured to emit a second pump beam $hv_2$ at tunable-wavelength that is different from that of the first pump beam $hv_1$, a nonlinear optical crystal 19 configured to generate an electromagnetic wave $hv_3$ of difference-frequency between the first pump beam $hv_1$ and the second pump beam $hv_2$, and an optical system 18 configured to irradiate the first pump beam and the second pump beam to the optical crystal 19, adjusting an external intersection angle $\Theta_{in}^{ext}$ between the first pump beam $hv_1$ and the second pump beam $hv_2$. A wavelength-tunable terahertz electromagnetic wave $hv_3$ is generated in the nonlinear optical crystal 19, by changing the frequency of the second pump beam $hv_2$ and the external intersection angle $\Theta_{in}^{ext}$, simultaneously. As shown in FIG. 8, similar to the electromagnetic wave generator according to the first embodiment a pulsed YAG laser oscillating at 1.064 micrometers is used, as an excitation light source 16, so that the first pump beam emitter 24 can operate, and a wavelength-tunable OPO 54, pumped by a third harmonic of the excitation light source (YAG laser) 16, is used as a light source configured to pump the first pump beam emitter 25e. In other words, for the electromagnetic wave generator according to the fourth embodiment, the first pump beam emitter 24 encompasses a first attenuator 52, and the second pump beam emitter 25 encompasses the wavelength-tunable OPO 54 and a second attenuator 53.

Moreover, as shown in FIG. 8, the electromagnetic wave generator according to the fourth embodiment inserts a timing feedback mechanism (means) 26 between the excitation light source (YAG laser) 16 and the first pump beam emitter 24. The timing control mechanism (means) 26 has a function to control the timing of the pulses of the pump beam (first pump beam) $hv_1$ and the signal beam (second pump beam) $hv_2$ arriving at the nonlinear optical crystal 19.

As above-explained, in a case that GaP crystal is used as the nonlinear optical crystal 19, the terahertz electromagnetic wave $hv_3$ is obtained efficiently in a wide range of frequency band, because the overlap among the terahertz electromagnetic wave $hv_3$, the pump beam $hv_1$ and the pump beam $hv_2$ in the nonlinear optical crystal is large, achieving angle phase matching with a slight angle between the pump beams $hv_1$ and $hv_2$, by increasing wavelength of the pump beams $hv_1$ and $hv_2$ larger than one micrometer. Two pump beams $hv_1$ and $hv_2$ are coupled by the polarization beam splitter 18 so that the two pump beams $hv_1$ and $hv_2$ can enter into the nonlinear optical crystal 19, which serves as the nonlinear optical crystal configured to generate the terahertz electromagnetic wave $hv_3$, with a small external intersection angle $\Theta_{in}^{ext}$.

Figure 10:
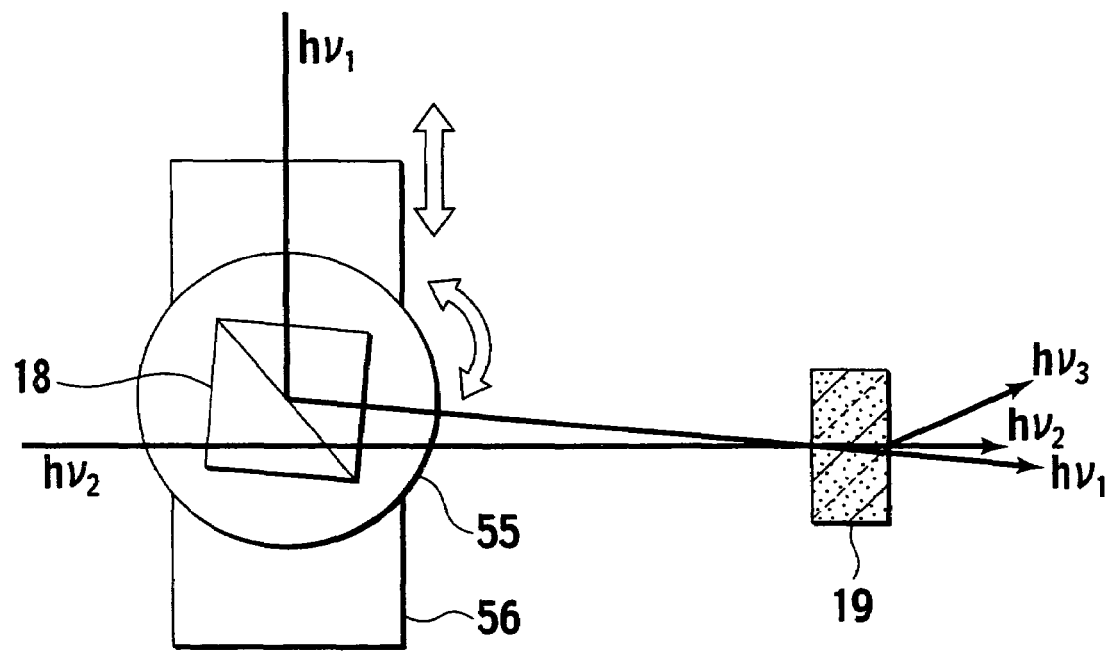
FIG. 10 illustrates another example of the control method of external intersection angle between the pump beams in the electromagnetic wave generator of the fourth embodiment of the present invention.

As shown in FIG. 9, the pump beam (first pump beam) $hv_1$ is transmitted through the polarization beam splitter 18, and the signal beam (second pump beam) $hv_2$, having an orthogonal polarization plane against the pump beam (first pump beam) $hv_1$, is irradiated from a right angle direction to the direction of the signal beam (second pump beam) $hv_2$, and the signal beam (second pump beam) $hv_2$ is reflected by a polarization surface of the polarization beam splitter 18, so that the signal beam (second pump beam) $hv_2$ can couple to the pump beam (first pump beam) $hv_1$ in approximately parallel configuration with a small external intersection angle $\Theta_{in}^{ext}$ Because the pump beam (first pump beam) $hv_1$ and the signal beam (second pump beam) $hv_2$ are enough to be overlapped in approximately parallel configuration, by using the polarization beam splitter 18, as shown in FIG. 10, another optical system such that the signal beam (second pump beam) $hv_2$ is transmitted through the polarization beam splitter 18, and the pump beam (first pump beam) $hv_1$, having an orthogonal polarization plane against the signal beam (second pump beam) $hv_2$, is irradiated from a right angle direction to the direction of the pump beam (first pump beam) $hv_1$, and the pump beam (first pump beam) $hv_1$ is reflected by a polarization surface of the polarization beam splitter 18, so that the pump beam (first pump beam) $hv_1$ can couple to the signal beam (second pump beam) $hv_2$ in approximately parallel configuration with a small external intersection angle $\Theta_{in}^{ext}$ can be acceptable.

Anyway, independent of whether the optical system shown in FIG. 9 or the optical system shown in FIG. 10 is adopted, a delay line 51 is inserted in an optical path passing through the first pump beam emitter 24 as the timing control mechanism (means) so that two pump beams $hv_1$ and $hv_2$ can arrive the nonlinear optical crystal 19 simultaneously. By implementing an optical path such that, after transmitting the output beam of the excitation light source (YAG laser) 16 to the delay line 51, the output beam can arrive at the first pump beam emitter 24, the timing of the pulses of the two pump beams $hv_1$ and $hv_2$ can be controlled so that they can arrive at the non linear optical crystal 19 simultaneously, The delay line 51 can be implemented by multiple numbers of reflection mirrors. For example, an approximately 2-3 m of optical path can be established by folding a plurality of optical paths at every one meter with the multiple numbers of reflection mirrors. Then, in order to change the delay time, the total optical path length is changed by displacing any one of the plurality of optical paths by moving the location of the reflection mirrors. In a case that the wavelength-tunable OPO 54 is employed, the delay time of the output optical pulse of the wavelength-tunable OPO 54 against the excitation light source (YAG laser) 16 is approximately a few nanoseconds (ns). In contrast, because the optical path length causes delay of 3.3 nanoseconds per one meter, a sufficient delay time can be achieved by providing an optical path of about 2-3 meters, which is implemented by multiple numbers of reflection mirrors.

In the second pump beam emitter 25, if selecting wavelength of the wavelength-tunable OPO 54 in a range of 1.038~1.0635 micrometers or 1.0646~1.091 micrometers, the generated difference-frequency v3 becomes 0.15~7 THz.

Intensity of the pump beam (first pump beam) $hv_1$ or the signal beam (secondary pump beam) $hv_2$ is adjusted by the first attenuator 52 or by the second attenuator 53 in a range of 0.1~50 milli-Joules, respectively. Each of the first attenuator 52 and the second attenuator 53 embraces a half-wavelength plate and an optical polarizer.

In a case that GaP crystal is employed as the nonlinear optical crystal, because the external intersection angle $\Theta_{in}^{ext}$ manifests frequency-dependent characteristics, as shown in FIG. 5, in view of the increase of the difference frequency $v_3$, the rotation of the polarization beam splitter 18 is controlled by the rotation stage 55, as shown in FIGS. 9 and 10, so as to obtain an arbitrary small external intersection angle $\Theta_{in}^{ext}$ in a range approximately from 0° to 4° between two pump beams $hv_1$ and $hv_2$. In order to intersect two pump beams $hv_1$ and $hv_2$ always at the same point on the surface of the nonlinear optical crystal 19 with an arbitrary small external intersection angle $\Theta_{in}^{ext}$, the nonlinear optical crystal 19 is allocated at a position approximately 60 millimeters away from the polarization beam splitter 18, the polarization beam splitter 18 is further driven to move on a beam-splitter linear stage 56, linking to the rotation of the rotation stage 55. Amount of the displacement of the beam-splitter linear stage 56 is approximately 0 to 6.3 millimeters.

The scheme for obtaining an arbitrary frequency instantly, or for sweeping the frequency at arbitrary speed is achieved by setting instantly the rotation angle of the mirror or the beam splitter, which is disposed close to the nonlinear optical crystal 19, while sweeping arbitrary the wavelength of at least one of two pump beams $hv_1$ and $hv_2$. For example, for a case that a wavelength-tunable OPO 54 is employed as the second pump beam emitter 25, wavelength of the wavelength-tunable OPO 54 can be controlled at by a personal computer 11 through such as GPIB communications, using a wavelength controller 3a. For the wavelength-tunable OPO 54 serving as the wavelength-tunable laser being incorporated in the second pump beam emitter 25, for example, Spectra-Physics, tunable MOP054-SL is available.

Figure 11:
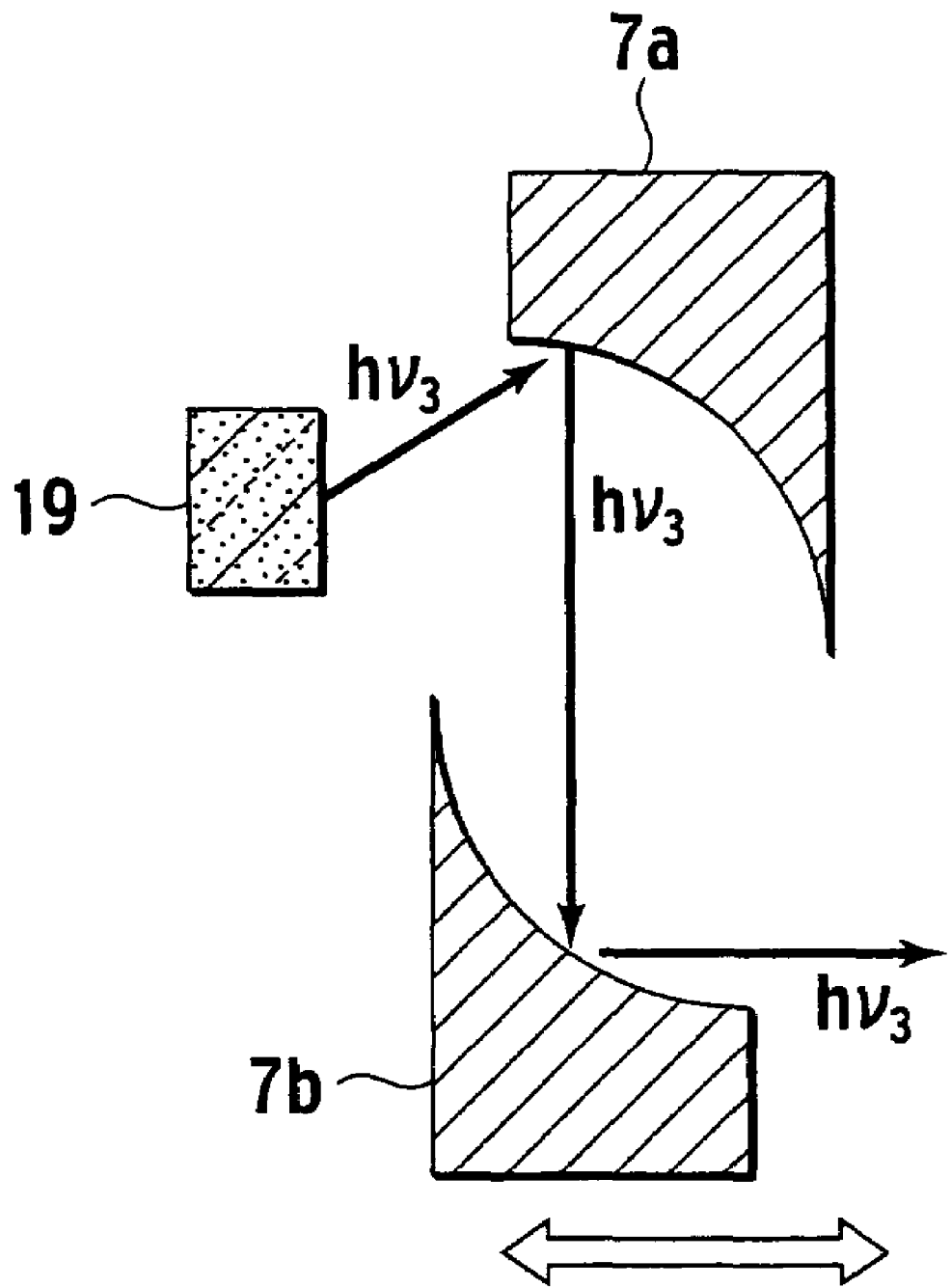
FIG. 11 illustrates control method of an exit direction of the generated terahertz electromagnetic wave in the electromagnetic wave generator, according to the fourth embodiment of the present invention.

As already explained with reference to FIG. 2, the frequency $v_3$ of the terahertz electromagnetic wave $hv_3$ being emitted from the nonlinear optical crystal 19 changes the exit angle (being defined as an angle between the pump beam $hv_1$ or $hv_2$ and the terahertz electromagnetic wave $hv_3$) $\Theta_f$. At frequency $v_3$=0.4~6 THz, the exit angle $\Theta_f$ becomes 30~60°. In order to make the terahertz electromagnetic wave $hv_3$ pass through on a constant line or a constant position, keeping the exit angle $\Theta_f$ to be independent of the frequency $v_3$, a pair of off-axial paraboloid reflectors 7a and 7b is used, as shown in FIG. 11. A first off-axial paraboloid reflector 7a is placed so as to capture the terahertz electromagnetic wave $hv_3$ of above-described frequency range by allocating the position of the first off-axial paraboloid reflector 7a close to the nonlinear optical crystal 19. On this occasion, if an optical configuration such that a position of the focal point of the first off-axial paraboloid reflector 7a coincides with an exit point of the terahertz electromagnetic wave $hv_3$ at the surface of the nonlinear optical crystal 19 is employed, an identical optical path for the beam of the terahertz electromagnetic wave $hv_3$ can be established, regardless of the exit direction of the terahertz electromagnetic wave $hv_3$. In other words, the reflected beam of the first off-axial paraboloid reflector 7a always passes through on a specific parallel line, regardless of the frequency $v_3$.

A second off-axial paraboloid reflector 7b is positioned as opposite to the first off-axial paraboloid reflector 7a and moves on a paraboloid reflector linear stage (the illustration is omitted) along the axis, which is perpendicular to the optical axis of the reflected terahertz electromagnetic wave $hv_3$, which is reflected by the first off-axial paraboloid reflector 7a. If the position of the first off-axial paraboloid reflector 7a is fixed so that the terahertz electromagnetic wave $hv_3$ is always received on the same point of the mirror surface of the second off-axial paraboloid reflector 7b so as to reflect the terahertz electromagnetic wave $hv_3$ at right angle direction, the terahertz electromagnetic wave $hv_3$ can pass through on the identical line, at every frequency $v_3$. Anyway, the focal point of the terahertz electromagnetic wave $hv_3$ moves on the identical line, however, when a horn-shaped light gathering optical system is disposed right before the electromagnetic detector of terahertz band such as a silicon bolometer or a DTGS infrared detector, the movement of the focal point will not cause problems.

For example, the rotation stage 55, on which the polarization beam splitter 18 is mounted, and the beam-splitter linear stage 56, which define the small external intersection angle $\Theta_{in}^{ext}$ between the incident pump beam $hv_1$ and $hv_2$, by using a stepping motor and a stepping motor controller 4 configured to control the stepping motor, can be controlled at high speed and easily, being instructed from a personal computer 11 through GPIB communication, USB communication or RS-232C communication. In other words, with an automatic-phase-matching control system configured to control the external intersection angle $\Theta_{in}^{ext}$ between two pump beams $hv_1$ and $hv_2$ automatically, in which the frequency $v_3$ is swept automatically and continuously by the wavelength controller 3a, the operation of which being linked with the operation of the motor controller 4, the maximum output can be generated from the nonlinear optical crystal 19 at every frequency $v_3$.

Figure 12:
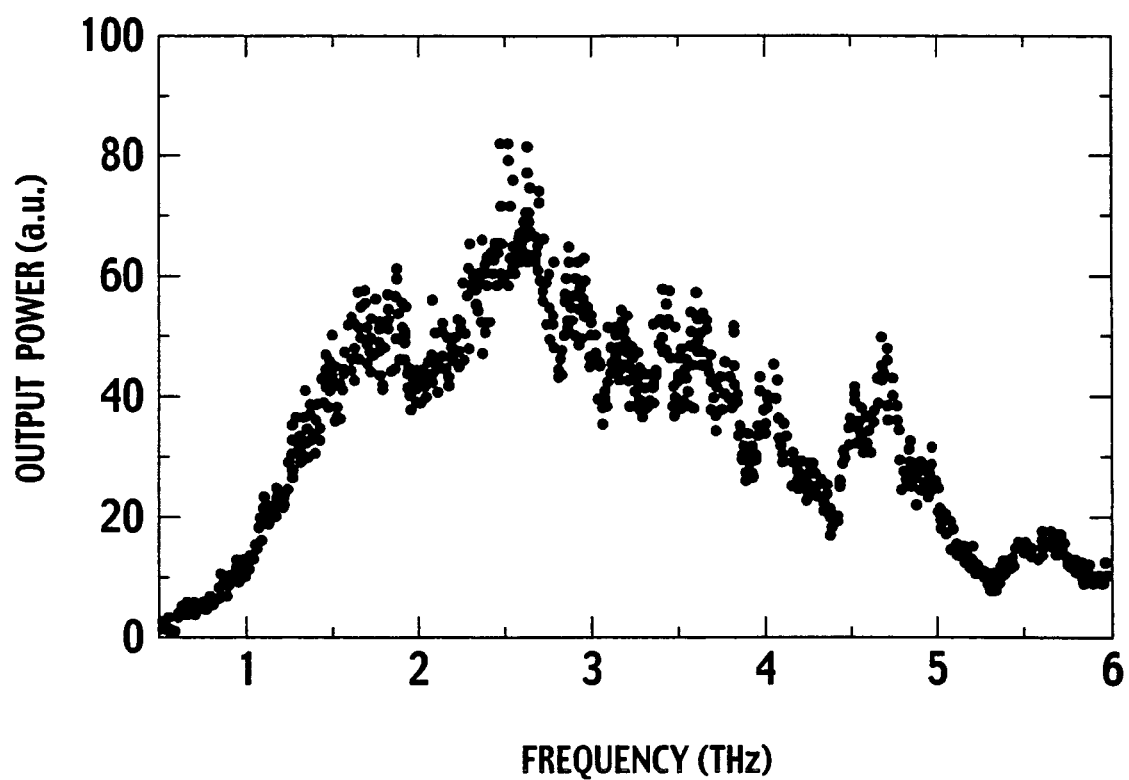
FIG. 12 illustrates one example of output characteristics of terahertz electromagnetic waves by the electromagnetic wave generator, according to the fourth embodiment of the present invention.

Although the illustration is omitted, by controlling the movement of a linear stage mounting the paraboloid reflector through the motor controller 4, it is possible to control the position of the second off-axial paraboloid reflector 7b easily at high speed, being instructed from a personal computer 11 through GPIB communication, USB communication or RS-232C communication. Therefore, the wavelength of the wavelength-tunable OPO 54, the external intersection angle $\Theta_{in}^{ext}$ between two pump beams $hv_1$ and $hv_2$, and the position of the second off-axial paraboloid reflector 7b can be controlled simultaneously, sweeping the frequency $v_3$ automatically and continuously so as to obtain the maximum output at every frequency $v_3$. In FIG. 12, output characteristic of the terahertz electromagnetic wave generator implemented by above-mentioned system is shown.

Moreover, although the illustration is omitted, in the configuration shown in FIG. 8, by sweeping automatically the frequency $v_3$ of the wavelength-tunable OPO 54 through the wavelength controller 3a, and by controlling the delay of the delay line 51 through the motor controller 4a, which is being linked with the wavelength controller 3a, the oscillation delay time in the wavelength-tunable OPO 54 can be controlled simultaneously with the change of the wavelength of the wavelength-tunable OPO 54. In other words, if an optical path is implemented by a plurality of reflection mirrors, automatic control of the oscillation delay time can be achieved, by moving any one of the reflection mirrors on the optical path through a stepping motor and a piezo driver.

Fifth Embodiment

Figure 13:
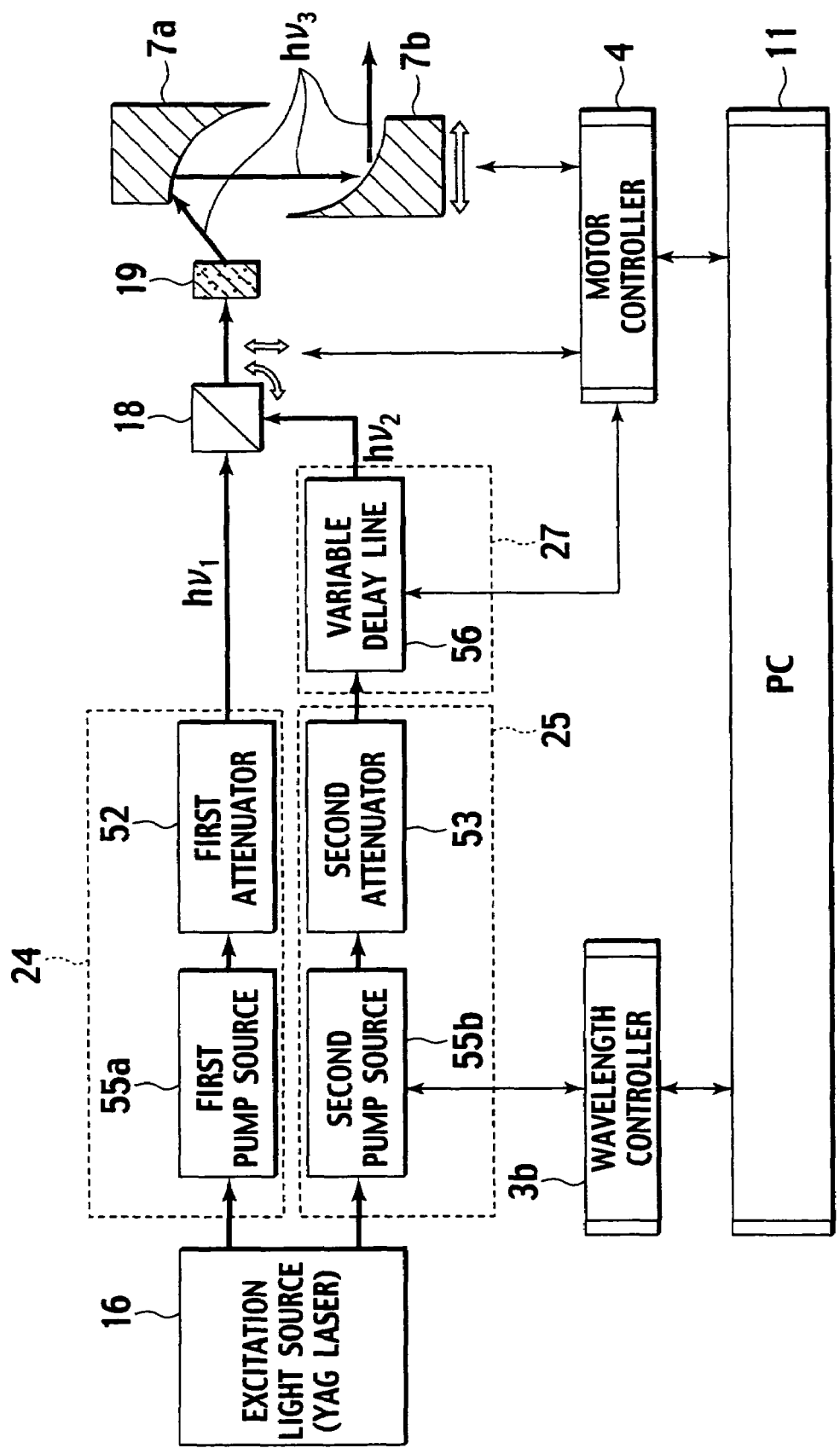
FIG. 13 illustrates an organization of an electromagnetic wave generator according to a fifth embodiment of the present invention.

As shown in FIG. 13, an electromagnetic generator according to a fifth embodiment of the present invention encompasses a first pump beam emitter 24 configured to emit a first pump beam $hv_1$, a second pump beam emitter 25 configured to emit a second pump beam $hv_2$ at tunable-wavelength that is different from that of the first pump beam $hv_1$, a nonlinear optical crystal 19 configured to generate an electromagnetic wave $hv_3$ of difference-frequency between the first pump beam $hv_1$ and the second pump beam $hv_2$, and an optical system 18 configured to irradiate the first pump beam and the second pump beam to the optical crystal 19, by adjusting an external intersection angle $\Theta_{in}^{ext}$ between the first pump beam $hv_1$ and the second pump beam $hv_2$. A wavelength-tunable terahertz electromagnetic wave $hv_3$ is generated in the nonlinear optical crystal 19, by changing the frequency of the second pump beam $hv_2$ and the external intersection angle $\Theta_{in}^{ext}$, simultaneously.

Moreover, as shown in FIG. 13, the electromagnetic wave generator according to the fifth embodiment inserts a timing feedback mechanism (means) 27 between the second pump beam emitter 25 and the optical system 18. The timing control mechanism (means) 27 has a function to control the timing of the pulses of the pump beam (first pump beam) $hv_1$ and the signal beam (second pump beam) $hv_2$ arriving at the nonlinear optical crystal 19.

A Cr-doped forsterite laser 55*a* and a Cr-doped forsterite laser 55*b* are employed as the first and second pump sources, which are installed in the first pump beam emitter 24 and the second pump beam emitter 25, respectively, which are wavelength tunable in a range of 1.15 to 1.35 micrometers.

A variable delay line 56 as the timing control system (means) 27 is installed in order for the two pump beams $hv_1$ and $hv_2$ to arrive simultaneously in the nonlinear optical crystal 19 on the optical path of the second pump beam emitter 25 side.

After transmitting the output beam of the second pump beam emitter 25 through the variable delay line 56, the output beam can arrive at the nonlinear optical crystal 19, the timing of the pulses of the two pump beams $hv_1$ and $hv_2$ can be controlled so that they can arrive at the non linear optical crystal 19 simultaneously.

The variable delay line 56 may be implemented by a plurality of reflection mirrors similar to the delay line 51 of the fourth embodiment. In this case, for example, in order to change the delay time, it is possible to change optical path length by displacing one of any reflection mirrors on the optical path by a stepping motor or a piezo driver.

Similar to the electromagnetic wave generator according to the fourth embodiment, two pump beams $hv_1$ and $hv_2$, having orthogonal polarization planes are irradiated to the nonlinear optical crystal 19 at a small external intersection angle $\Theta_{in}^{ext}$. For example, the wavelength of the pump beam $hv_2$ being emitted from the first light source installed in the first pump beam emitter 24 is fixed at 1.20 micrometers, and then the difference frequency becomes 0.5~7 THz, by selecting the wavelength of the pump beam $hv_2$ being emitted from the second pump source installed in the second pump beam emitter 25 in a range of 1.2024~1.2346 micrometers. Same as the second embodiment, the Cr-doped forsterite lasers 55*a* and 55*b*, serving as the first and second pump sources being installed in the first pump beam emitter 24 and the second pump beam emitter 25, by Yb doped YLF lasers or Yb doped fiber lasers.

As already described in the electromagnetic wave generator according to the second embodiment, because the Cr-doped forsterite lasers 55*a* and 55*b* employ Cr level energy in the forsterite crystal, a high output power can be achieved, and further, the spectrum linewidth 10~15 GHz can be achieved, without using a special system (means) such as the injection seeding. Moreover, although the Cr-doped forsterite lasers 55*a* and 55*b* can be pumped by the YAG laser as the excitation light source 16 similar to the OPO laser, it is not necessary to use higher harmonic of the YAG laser like the OPO laser, the effectiveness of simple structure with low manufacturing cost can be achieved. However, a timing control system (means), configured to control the delay time such that two pump beams $hv_1$ and $hv_2$ can arrive to the nonlinear optical crystal 19 simultaneously, is required, because the Cr-doped forsterite laser 55*a* and 55*b* sometimes have different delay time up to the beginning of the oscillation, the delay time depends on the oscillation wavelength.

In FIG. 13, although an example such that the variable delay line 56 is installed as the timing control system (means) at output side of the second pump beam emitter 25 so as to change the optical path length, on the contrary, the variable delay line functioning as the timing control system (means) can be inserted in the optical path through the first pump beam emitter 24. Alternatively, as the timing control system (means), the two Cr-doped forsterite laser 55*a* and 55*b*, which are incorporated respectively in the first pump beam emitter 24 and the second pump beam emitter 25, may have dedicated excitation light sources (YAG lasers) so that the two Cr-doped forsterite laser 55*a* and 55*b* can be pumped by the dedicated excitation light sources independently, wherein the delay between the oscillation start time of the two excitation light sources is adjusted. Depending on the oscillation wavelength, sometimes, the delay time of the two Cr-doped forsterite laser 55*a* and 55*b* up to the oscillation starting time may become larger than 10 nanoseconds. In the longer delay time, if the variable delay line 56 is implemented by a plurality of reflection mirrors, as the optical path length may become much longer, the size of the variable delay line 56 becomes too large. Therefore, in the case of longer delay time, the architecture of using two excitation light sources configured to pump independently is better for miniaturization of the electromagnetic wave generator.

Figure 14:
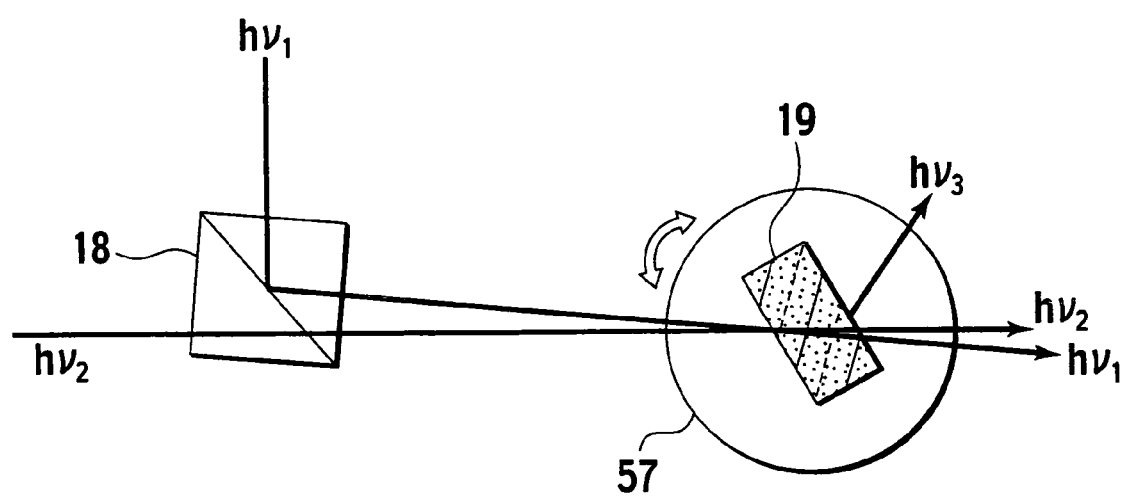
FIG. 14 illustrates a method for controlling rotation angles of a nonlinear optical crystal 19 in the electromagnetic wave generator of the fifth embodiment of the present invention.

In the electromagnetic wave generator according to the fifth embodiment, an incident beam optical system is adapted for the nonlinear optical crystal 19, which is almost the same as the electromagnetic wave generator of the fourth embodiment. However, because the wavelengths of the incident beams, in other words, because the energies are different, the small external intersection angle $\Theta_{in}^{ext}$ between the incident pump beams $hv_1$ and $hv_2$ is slightly different from the electromagnetic wave generator of the fourth embodiment of the present invention. With the small external intersection angle $\Theta_{in}^{ext}=0\sim3°$ between two pump beams $hv_1$ and $hv_2$, the frequency becomes $v_3=0.4\sim3$ THz of the emitted terahertz electromagnetic wave $hv_3$, and the exit angle becomes $\Theta_f=50\sim80°$, which is larger than the exit angle $\Theta_f$ of the electromagnetic wave generator according to the fourth embodiment. When the frequency $v_3$ of the emitted terahertz electromagnetic wave $hv_3$ becomes a higher frequency such that the frequency $v_3$ exceeds approximately 3~4 THz, the terahertz electromagnetic wave $hv_3$ will suffer from the total internal reflection at the electromagnetic wave exit face or the back face of the nonlinear optical crystal 19. In order to avoid the total internal reflection, as shown in FIG. 14, the nonlinear optical crystal 19 is mounted on the crystal rotation stage 57 so that the nonlinear optical crystal 19 can be rotated as needed, and total internal reflection is prevented at the electromagnetic wave exit face at higher frequencies. The crystal rotation stage 57 implements the "angle control system (means)" configured to control the angle of the electromagnetic wave exit face against the optical axis of the first pump beam $hv_1$. Because, it is arbitrary to define the angle against the optical axis of the first pump beam $hv_1$ or against the optical axis of the second pump beam $hv_2$, in the angle control system (means) of the fifth embodiment, the angle of back face (electromagnetic wave exit face) of the nonlinear optical crystal 19 can be defined against the axis of the second pump beam $hv_2$. As to the light gathering optical system of the terahertz electromagnetic wave $hv_3$ being emitted from the nonlinear optical crystal 19, the design almost same as the electromagnetic wave generator of the fourth embodiment of the present invention can be adopted.

As explained in the electromagnetic wave generator according to the fourth embodiment, the rotation stage 55, on which the polarization beam splitter 18 is mounted, and the beam-splitter linear stage 56, which define the small external intersection angle $\Theta_{in}^{ext}$ between the incident pump beam $hv_1$ and $hv_2$, by using a stepping motor and a stepping motor controller 4 configured to control the stepping motor, can be controlled, being instructed from a personal computer 11 through GPIB communication, USB communication, or RS-232C communication. In other words, with an automatic-phase-matching control system configured to control the external intersection angle $\Theta_{in}^{ext}$ between two pump beams $hv_1$ and $hv_2$ automatically, in which one of two Cr-doped forsterite laser 55a and 55b, for example, the laser wavelength of the first Cr-doped forsterite laser 55a is fixed, and the laser wavelength of the second Cr-doped forsterite laser 55b is swept automatically and continuously by the wavelength controller 3a so as to sweep the frequency $v_3$, the operation of the wavelength controller 3a being linked with the operation of the motor controller 4, the maximum output can be generated from the nonlinear optical crystal 19 at every frequency $v_3$.

Moreover, while the frequency $v_3$ of the second Cr-doped forsterite laser 55b is swept by using the wavelength controller 3a, the variable delay line 56 is driven by the motor controller 4, being linked with the wavelength controller 3a so that the oscillation delay time of the second Cr-doped forsterite laser 55b, being coupled by the change of the wavelength of the second Cr-doped forsterite laser 55b. In other words, if the optical path is implemented by a plurality of the reflection mirrors, the motor controller 4 drives the stepping motor so that any one of reflection mirrors can moved on the optical path, and then the automatic control of the oscillation delay time can be achieved.

Moreover, when the frequency $v_3$ of the second Cr-doped forsterite laser 55b is swept automatically by using the wavelength controller 3a, and if the rotation of the crystal rotation stage 57, implementing the angle control system (means), is controlled by the motor controller 4, the operation of which is linked with the wavelength controller 3a, the angle of the back face (electromagnetic wave exit face) of the nonlinear optical crystal 19 against the optical axis can be controlled, being linked with the wavelength of the second Cr-doped forsterite laser 55b.

Similarly, for example, when the stepping motor is driven by the motor controller 4 so as to move the linear stage for mounting the paraboloid reflector, of which the illustration is omitted, the movement of the paraboloid reflector can be controlled, being linked with the wavelength of the second Cr-doped forsterite laser 55b.

Therefore, while sweeping the laser wavelength of the second Cr-doped forsterite laser 55b by the wavelength controller 3a, by controlling automatically the oscillation delay time, the external intersection angle $\Theta_{in}^{ext}$ between two pump beams $hv_1$ and $hv_2$, the angle of the back face (electromagnetic wave exit face) of the nonlinear optical crystal 19 against the optical axis, and the position of the second off-axial paraboloid reflector 7b simultaneously, the maximum output is obtained at every frequency $v_3$.

The wavelength controller 3a and the motor controller 4 of the stepping motor shown in FIG. 9 can be controlled simply at high speed, by using a personal computer 11, through GPIB communication, USB communication, or RS-232C communication, etc.

Sixth Embodiment

Figure 15:
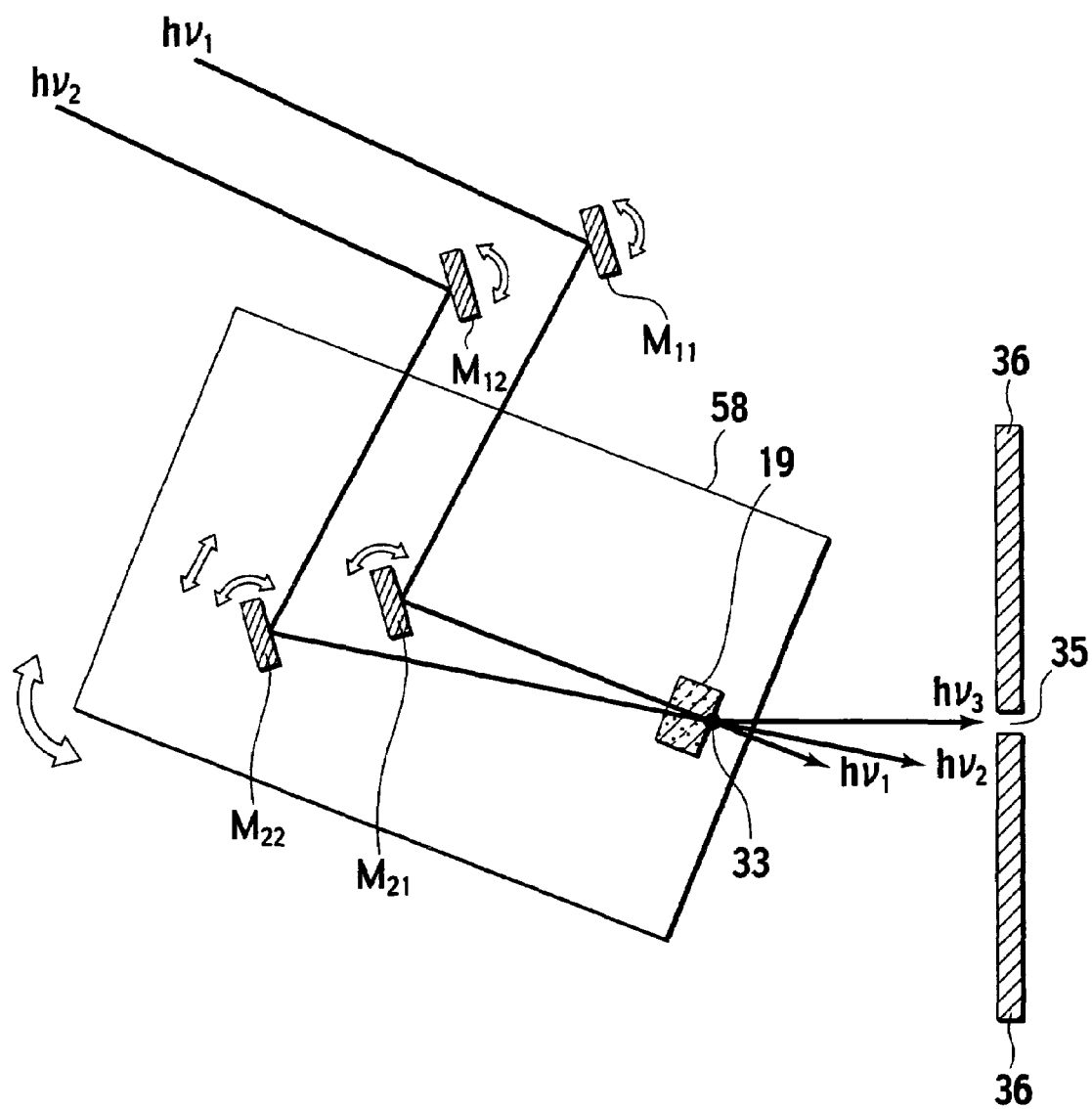
FIG. 15 illustrates a control method of exit direction of the generated terahertz electromagnetic wave in an electromagnetic wave generator, according to a sixth embodiment of the present invention.

Similar to the electromagnetic wave generator according to the first to fifth embodiments, an electromagnetic wave generator according to a sixth embodiment irradiates two pump beams $hv_1$ and $hv_2$ into a nonlinear optical crystal 19 so as to generate difference frequency. However, as shown in FIG. 15, the electromagnetic generator according to the fifth embodiment encompasses a terahertz-generator rotation stage 58 configured to mount a first incident mirror $M_{21}$ and second incident mirror $M_{22}$ with the nonlinear optical crystal 19. The first mirror $M_{21}$ is a rotatable mirror that reflects the first pump beam $hv_1$ so as to adjust an incident angle of the first pump beam $hv_1$ to the nonlinear optical crystal 19. The second mirror $M_{22}$ is a rotatable mirror that reflects the second pump beam $hv_2$ so as to adjust an incident angle of the second pump beam $hv_2$ to the nonlinear optical crystal 19. The terahertz-generator rotation stage 58, as shown in FIG. 15, turns around on an exit point 33 of the electromagnetic wave exit face of the nonlinear optical crystal 19, defining the exit point 33 as a central axis of the rotation. By controlling the rotation angle of the terahertz-generator rotation stage 58, at any arbitrary frequency, the emitted terahertz electromagnetic wave $hv_3$ can be focused into an arbitrary point, with a specific exit angle against the electromagnetic wave exit face, regardless of the exit angle.

To the first incident mirror $M_{21}$, the first pump beam $hv_1$ irradiates via a first intermediate mirror $M_{11}$. The first intermediate mirror $M_{11}$ is a rotatable mirror that reflects the first pump beam $hv_1$ and so as to adjust an incident angle of the first pump beam $hv_1$ to the first incident mirror $M_{21}$. To the second incident mirror $M_{22}$, the second pump beam $hv_2$ irradiates via a second intermediate mirror $M_{12}$. The second intermediate mirror $M_{12}$ is a rotatable mirror that reflects the second pump beam $hv_2$ so as to adjust an incident angle of the second pump beam $hv_2$ to the second incident mirror $M_{22}$. In other words, the electromagnetic wave generator according to the fifth embodiment adjusts the rotation angles of the mirrors $M_{11}$, $M_{12}$ so as to control the pump beam exit angle, and simultaneously, rotates the terahertz-generator rotation stage 58, controls the movements of the positions of the mirrors $M_{21}$, $M_{22}$, and further controls the rotation angles of the mirrors $M_{21}$, $M_{22}$.

As shown in FIG. 15, with a shielding plate 36 having a slit 35 in the exit direction of the terahertz electromagnetic wave, the terahertz electromagnetic wave $hv_3$ can be emitted (supplied) always through the slit 35, regardless of the terahertz frequency.

The same feature can be achieved by a constitution in which, replacing the mirror $M_{21}$, $M_{22}$ by prisms, the nonlinear optical crystal 19 and the prisms are mounted on the terahertz generation rotation stage 58.

Seventh Embodiment

Because the life of the excited level of Cr in the Cr-doped forsterite is long, the Cr-doped forsterite is employed for the first and second pump sources, which was explained in the electromagnetic wave generator according to the second embodiment, there is a long delay time from the instant when the Cr-doped forsterite is excited by the pulse of the YAG laser, as the excitation light source 16, to the instant when the output pulse is generated. Because the delay times are different depending various kinds of factors, although two Cr-doped forsterite lasers are excited simultaneously by the excitation light source (YAG laser) 16, as shown in FIG. 6, there is a situation where the outputs are not generated simultaneously. Because this time lag can become larger than the pulse width of the output beam, or a few nanoseconds, in this case, since there is no overlap of the pump beam (first pump beam) $hv_1$ and the signal beam (second pump beam) $hv_2$ in time domain, the terahertz electromagnetic wave $hv_3$ cannot be obtained. If the time lag is smaller than the pulse width of the output beam, the smaller time lag can cause the output power of the terahertz electromagnetic wave to decrease. Therefore, in the electromagnetic wave generator according to the fifth embodiment, as shown in FIG. 13, a variable delay line 56 serving as the timing control system (means) is incorporated in the optical path passing through the second pump beam emitter 25 so that the optical path length can be adjusted.

Figure 16:
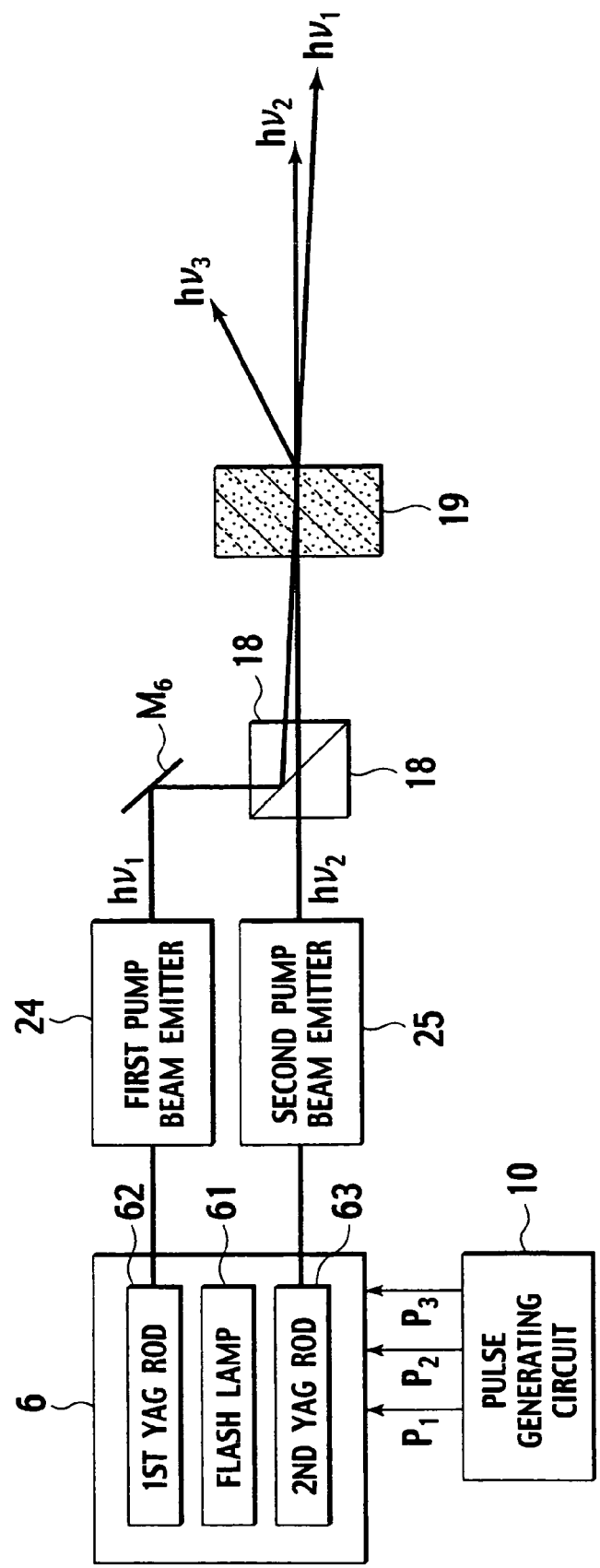
FIG. 16 illustrates an organization of an electromagnetic wave generator, according to a seventh embodiment of the present invention.

An electromagnetic wave generator according to a seventh embodiment generates a high efficient frequency-tunable terahertz electromagnetic wave by installing a timing control system (means) (6, 10) configured to control timing of arriving the pulses of the signal beams, such that the pulses of the signal beams from two Cr-doped forsterite lasers, serving as the first and second pump sources, can arrive simultaneously at the nonlinear optical crystal 19. As explained in the electromagnetic wave generator according to the fifth embodiment, although the scheme such that two Cr-doped forsterite lasers 55a and 55b, being incorporated in the first pump beam emitter 24 and the second pump beam emitter 25, respectively, are provided with dedicated exciting excitation light sources can implement a timing control system (means) configured to adjust the oscillation starting times between two excitation light sources, a timing control system (means) according to the seventh embodiment encompasses a double pulse YAG laser 6 configured to adjust a time lag between the excitation light pulses for two Cr-doped forsterite lasers, the double pulse YAG laser being served as the first and second pump sources for exciting independently two Cr-doped forsterite lasers. In other words, in contrast to the configuration of the second embodiment shown in FIG. 6, in which an output from a single excitation light source (YAG laser) 16 is divided into two beams by the beam splitter, in the electromagnetic wave generator according to the seventh embodiment, as shown in FIG. 16, a single flash lamp 61 excites a first YAG rod 62 and a second YAG rod 63, in other words, a "double pulse YAG laser 6" is used as the dedicated excitation light sources so that two Cr-doped forsterite laser can be pumped by the first YAG rod 62 and the second YAG rod 63, wherein the double pulse YAG laser 6 serves as the timing control system (means). The double pulse YAG laser 6 excites the first YAG rod 62 and the second YAG rod 63 by the single flash lamp 61, and then two output light pulses $hv_1$ and $hv_2$ at wavelength of 1064 nanometers are obtained.

Because, after the instant when the flash lamp 61 pumps the first YAG rod 62 and the second YAG rod 63, quite a long time is required for generating each of the oscillations of YAG lasers by the Q-switched pulse, it is possible to change the timings of Q-switched pulses for the first YAG rod 62 and the second YAG rod 63, respectively, in an accuracy of one nanosecond. Therefore, in the timing control system (means) according to the seventh embodiment, by adjusting the time lag between the instant when the first pump source (Cr-doped forsterite laser) is excited by the excitation light pulse from the first YAG rod 62 and the instant when the second pump source (Cr-doped forsterite laser) is excited by the excitation light pulse from the second YAG rod 63, the timings are controlled so that the pulses of pump beams from the first pump source (first pump beam) and that of signal beam (second pump beam) from the second pump source can arrive to the nonlinear optical crystal 19 almost simultaneously. The terms "almost simultaneously" means "at short enough time shorter than the pulse width of the output beam of the Cr-doped forsterite laser", for example, because the pulse width of Cr-doped forsterite laser is generally about 20~30 nanoseconds, in this case, it is preferable to make the time-lag of one nanosecond or less than one nanosecond.

As shown in FIG. 16, similar to the electromagnetic wave generator according to the second embodiment of the present invention, the electromagnetic wave generator according to the seventh embodiment of the present invention encompasses an optical system ($M_1$, 18) configured to irradiate the first pump beam and the second pump beam to the nonlinear optical crystal 19 by adjusting the external intersection angle $\Theta_{in}^{ext}$ between two pump beams $hv_1$ and $hv_2$. The optical system ($M_6$, 18) embraces a reflection mirror (mirror) $M_6$ and a polarization beam splitter 18. The reflection mirror is a rotatable mirror configure to adjust the incident angle of the first pump beam $hv_1$ to the polarization beam splitter 18, by reflecting the first pump beam $hv_1$ emitted from the first pump beam emitter 24. According to the optical system ($M_6$, 18) shown in FIG. 16, the signal beam (second pump beam) $hv_2$ from the second pump beam emitter 25 is transmitted to the polarization beam splitter 18. Also, the pump beam (first pump beam) $hv_1$ emitted from the first pump beam emitter is irradiated to the polarization surface of the polarization beam splitter 18 at right incident angle, the pump beam (first pump beam) $hv_1$ is reflected by the reflection mirror (mirror) $M_6$ so as to control the incident angle of the pump beam (first pump beam) $hv_1$, then implementing an optical system configured to irradiate the pump beam (first pump beam) $hv_1$ and the signal beam (second pump beam) $hv_2$ to the nonlinear optical crystal 19 so that the pump beam (first pump beam) $hv_1$ and the signal beam (second pump beam) $hv_2$ are coupled in almost parallel configuration with a small external intersection angle $\Theta_{in}^{ext}$ However, because the pump beam (first pump beam) $hv_1$ and the signal beam (second pump beam) $hv_2$ are enough to be overlapped in approximately parallel configuration, by using the polarization beam splitter 18, as shown in FIG. 9, another optical system such that the pump beam (first pump beam) $hv_1$ is transmitted through the polarization beam splitter 18, and the signal beam (second pump beam) $hv_2$, having an orthogonal polarization plane against the pump beam (first pump beam) $hv_1$, is irradiated from a right angle direction to the direction of the signal beam (second pump beam) $hv_2$, and the signal beam (second pump beam) $hv_2$ is reflected by a polarization surface of the polarization beam splitter 18, so that the signal beam (second pump beam) $hv_2$ can couple to the pump beam (first pump beam) $hv_1$ in approximately parallel configuration with a small external intersection angle $\Theta_{in}^{ext}$ can be adopted. Then, while changing the frequency of the second pump beam $hv_2$, by driving the optical system ($M_6$, 18) so as to change the external intersection angle $\Theta_{in}^{ext}$ continuously, the wavelength-tunable terahertz electromagnetic wave $hv_3$ is generated from the nonlinear optical crystal 19.

Because the optical system ($M_6$, 18) shown in FIG. 16 is an example, other than the reflection mirror (mirror) $M_6$ and the polarization beam splitter 18, it is acceptable to add another optical element such as a mirror to the optical system ($M_6$, 18), and it is possible to replace by the reflection mirror (mirror) $M_6$ by another optical element, such as a prism, having an equivalent function of the reflection mirror (mirror) $M_6$.

The feature, such that the pulse of the pump beam (first pump beam) from the first pump source and the pulse of the signal beam (second pump beam) from the second pump source arrive to the nonlinear optical crystal 19 almost simultaneously, means the outputs (pulses) from the first and second light sources are emitted almost simultaneously. In order to emit the outputs (pulses) of two Cr-doped forsterite lasers as the first and second pump sources almost simultaneously, it is preferable to prepare a program for adjusting the timings of Q-switched pulses of the double pulse YAG laser 6 in advance. Alternatively, by providing a loop for feedback-control configured to control the timings of the generations of the Q-switched pulses so as to maximize the output power of the terahertz electromagnetic wave, the timing of the pump beam (first pump beam) from the first pump source can coincide with the timing of the signal beam (second pump beam) from the second pump source.

A trigger pulse generation circuit 10, as shown in FIG. 16, drives the double pulse YAG laser 6. In other words, the trigger pulse generation circuit 10 implements the timing control system (means) (6, 10), which controls the pulse of the signal beam (second pump beam) and the pulse of the pump beam (first pump beam) so as to arrive the nonlinear optical crystal 19 almost simultaneously by the trigger pulse generation circuit 10 and double pulse YAG laser 6, wherein the trigger pulse generation circuit 10 generates a flush lump excitation pulse $P_1$ and Q-switched pulses $P_2$ and $P_3$ for YAG lasers.

In FIG. 16, Cr-doped forsterite lasers are used as the first pump source for the first pump beam emitter 24 and the second pump source for the second pump beam emitter 25, respectively. Because the delay time of Cr-doped forsterite laser is mainly determined by the excitation light intensity from the double pulse YAG laser 6 and the output wavelength of the Cr-doped forsterite lasers, two Cr-doped forsterite lasers as the first and second pump sources do not always generate the outputs in identical timing. In order to sweep the frequency $v_3$ of the terahertz electromagnetic wave $hv_3$, for example, while the frequency of one Cr-doped forsterite laser (first pump source) implementing the first pump beam emitter 24 is fixed, the wavelength of other Cr-doped forsterite laser (second pump source) implementing the second pump beam emitter 25 is swept (on the contrary, it is acceptable to fix the frequency of other Cr-doped forsterite laser (second pump source) implementing the first pump beam emitter 24 and to sweep the wavelength of one Cr-doped forsterite laser (first pump source) implementing the first pump beam emitter 25.).

Because the frequency and the output intensity of the Cr-doped forsterite laser (first pump source) implementing the second pump beam emitter 25 changes with sweeping, as function of these two parameters, a program for controlling the timing lag "t" of two Q-switched pulses $P_2$ and $P_3$, under the condition such that two Cr-doped forsterite lasers provide the same output power, is prepared in advance, and then, it is preferable to generate two Q-switched pulses $P_2$ and $P_3$ by the program. Because the output pulse width of the Cr-doped forsterite laser is approximately ten nanoseconds, it is sufficient to control the timing lag "t" between two Q-switched pulses $P_2$ and $P_3$ in an accuracy of one nanosecond.

The pump beam (first pump beam) $hv_1$ and the signal beam (second pump beam) $hv_2$ emitted from the first pump beam emitter 24 and the second pump beam emitter 25, respectively, are irradiated to the nonlinear optical crystal 19 so that the pump beam (first pump beam) $hv_1$ and the signal beam (second pump beam) $hv_2$ can be overlapped in approximately parallel configuration with a small external intersection angle $\Theta e_{in}^{ext}$ by the polarization beam splitter 18. From the nonlinear optical crystal 19, the terahertz electromagnetic wave $hv_3$ having a difference-frequency between the pump beam (first pump beam) $hv_1$ and the signal beam (second pump beam) $hv_2$ is emitted.

As explained in the fifth embodiment, for a case when using two Cr-doped forsterite lasers 55a and 55b, delay time may be larger than 10 nanoseconds, depending on the output wavelength. In this situation, in the variable delay line 56 implemented by a plurality of reflection mirrors, the optical path length becomes longer, and then the size of the apparatus may become much larger. Therefore, a situation where required delay time to be adjusted becomes longer, as the electromagnetic wave generator according to the seventh embodiment, an architecture using the double pulse YAG laser 6 is effective for miniaturization of the electromagnetic wave generator.

Moreover, same as the second and fifth embodiments, it is acceptable to substitute the Cr-doped forsterite lasers as the first and second pump sources, implementing the first pump beam emitter 24 and the second pump beam emitter 25, respectively, by the Yb-doped YLF laser or Yb-doped fiber laser.

Eighth Embodiment

Figure 17:
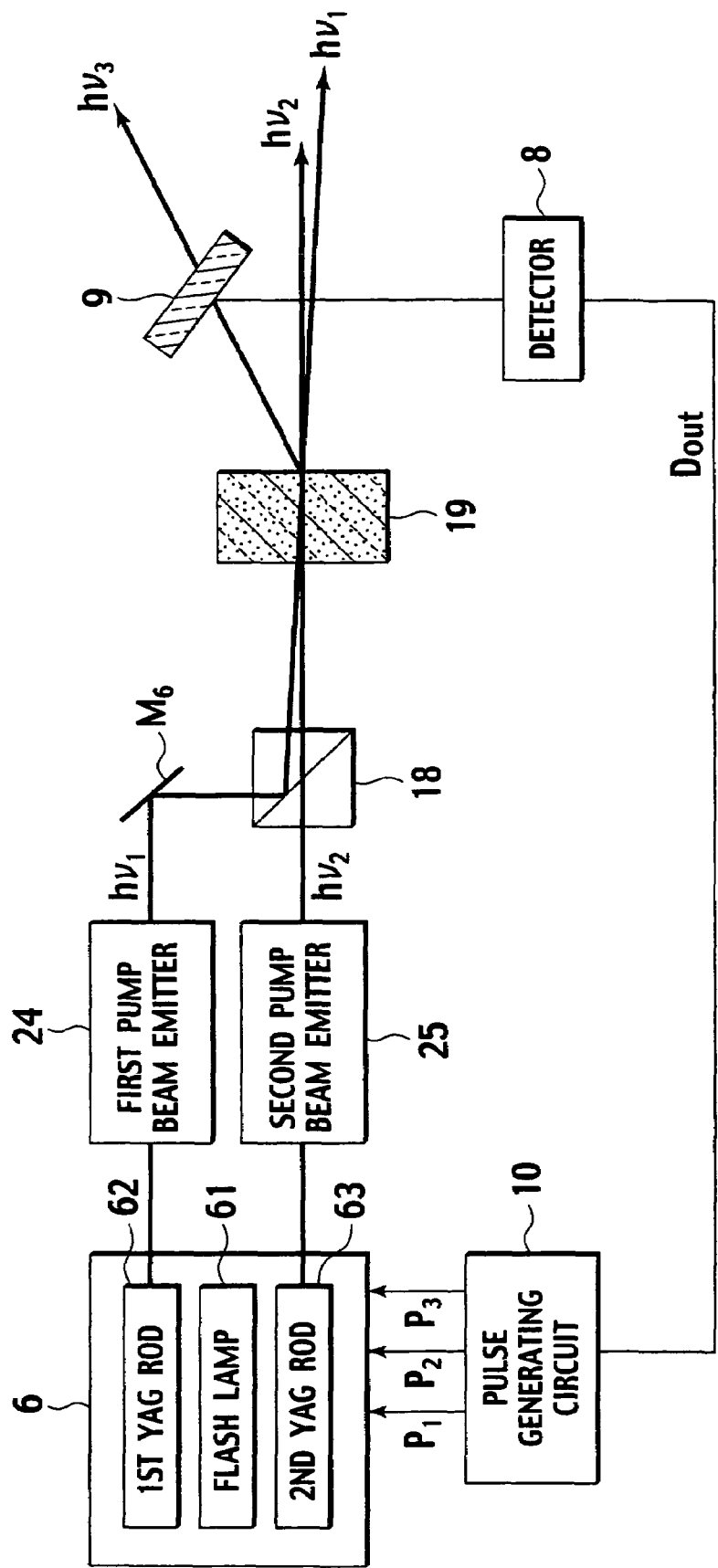
FIG. 17 illustrates an organization of an electromagnetic wave generator, according to an eighth embodiment of the present invention.

In an electromagnetic wave generator according to an eighth embodiment, the terahertz intensity is detected by a detector 8, after dividing the terahertz electromagnetic wave output by a beam splitter 9, as shown in FIG. 17.

Detected output $D_{out}$ provided from the detector 8 is fed back to the timing control system (means) (6, 10) encompassing a trigger pulse generation circuit 10 and double pulse YAG laser 6. In other words, by feeding the detected output $D_{out}$ into the trigger pulse generation circuit 10, a feedback loop is established, which can detect automatically the optimum timing lag "t" between the Q-switched pulse $P_2$ and $P_3$ so as to obtain the maximum power of the terahertz electromagnetic wave. Because others are substantially same as the electromagnetic wave generator according to the seventh embodiment, repeated explanation is omitted.

In addition, optimal value can be obtained at high speed using the program value, which is described in the electromagnetic wave generator according to the seventh embodiment, as an initial setting value for the feedback.

Other Embodiments

As explained above, the present invention is described by means of the first to eighth embodiments, the statement of disclosure or the drawings should not be understood as limiting the invention. Various modifications or alternate embodiments will become possible for those skilled in the art after receiving the teaching of the present disclosure. In other words, the present invention includes inherently the various embodiments, which are not described here. Therefore, technical scopes of the present invention are prescribed only by the description of claims, being proper from the above explanation.

INDUSTRIAL APPLICABILITY

The terahertz electromagnetic wave generator of the present invention can be applied to industrial fields such as terahertz electromagnetic wave irradiation tools or terahertz spectroscopic measurement tools, because terahertz electromagnetic waves of any frequency in a range of approximately 0.5 THz and 7 THz can be generated instantly with a high output power at particular position. Moreover, because a compact-size and high-stability frequency-tunable terahertz electromagnetic wave source can be provided, the terahertz electromagnetic wave generators of the present invention can be applied to a wide range of applications, including industrial fields of measurement of terahertz oscillation spectrum in biological molecules or medical terahertz imaging spectrum. Especially, the terahertz electromagnetic wave generators of the present invention can be applied to a spectroscopic light source using the wavelength-tunable terahertz electromagnetic wave configured to identify large molecules or polymers such as biological substances or cancerous cells.

The invention claimed is:

1. An electromagnetic wave generator comprising:
   a first pump beam emitter including a first pump source implemented by a first Cr-doped forsterite laser, configured to emit a first pump beam having a wavelength larger than one micrometer;
   a second pump beam emitter including a second pump source implemented by a second Cr-doped forsterite laser, configured to emit a wavelength-tunable second pump beam having a wavelength larger than one micrometer, the wavelength of which is different from the wavelength of the first pump beam;
   a nonlinear optical crystal having an electromagnetic wave exit face, configured to generate an electromagnetic wave of a difference frequency between the first and second pump beams and to emit the electromagnetic wave from the electromagnetic wave exit face;
   an optical system configured to irradiate the first and second pump beams to the nonlinear optical crystal, by adjusting an external intersection angle between the first and second pump beams within 0.5° at the difference frequency of 1 THz, and
   an angle control mechanism configured to rotate the nonlinear optical crystal so as to control an angle of the electromagnetic wave exit face against an optical axis of the first pump beam,
   wherein a frequency-tunable terahertz electromagnetic wave, tunable over a wide frequency band spanning from 0.5 to 7 THz, is emitted from the electromagnetic wave exit face, by changing the frequency of the second pump beam, being linked with the change of the external intersection angle and the change of the angle of the electromagnetic wave exit face.

2. The electromagnetic wave generator of claim 1, wherein the nonlinear optical crystal is GaP crystal, $ZnGeP_2$ crystal, or GaSe crystal.

3. The electromagnetic wave generator of claim 1, further comprising an excitation light source configured to excite the first and second pump sources so as to emit the first and second pump beams from the first and second pump sources, respectively.

4. The electromagnetic wave generator of claim 3, further comprising a timing control mechanism configured to control arrival timings of pulses of the first and second pump beams to the nonlinear optical crystal.

5. An electromagnetic wave generator comprising:
   a first pump beam emitter including a first pump source implemented by a first Cr-doped forsterite laser, configured to emit a first pump beam;
   a second pump beam emitter including a second pump source implemented by a second Cr-doped forsterite laser, configured to emit a wavelength-tunable second pump beam, the wavelength of which is different from the wavelength of the first pump beam; and
   a nonlinear optical crystal having an electromagnetic wave exit face, including one of a GaP crystal and a $ZnGeP_2$ crystal, configured to generate an electromagnetic wave of a difference frequency between the first and second pump beams and to emit the electromagnetic wave from the electromagnetic wave exit face; and
   an angle control mechanism configured to rotate the nonlinear optical crystal so as to control an angle of the electromagnetic wave exit face against an optical axis of the first pump beam,
   wherein a frequency-tunable terahertz electromagnetic wave, tunable over a wide frequency band spanning from 0.5 to 7 THz, is emitted from the electromagnetic wave exit face, by changing the frequency of the second pump beam.

6. An electromagnetic wave generator comprising:
   a first pump beam emitter including a first pump source implemented by a first Cr-doped forsterite laser, configured to emit a first pump beam;
   a second pump beam emitter including a second pump source implemented by a second Cr-doped forsterite laser, configured to emit a wavelength-tunable second pump beam, the wavelength of which is different from the wavelength of the first pump beam;
   a nonlinear optical crystal having an electromagnetic wave exit face, configured to generate an electromagnetic wave of a difference frequency between the first and second pump beams and to emit the electromagnetic wave from the electromagnetic wave exit face;
   an optical system configured to irradiate the first and second pump beams to the nonlinear optical crystal, by adjusting an external intersection angle between the first and second pump beams;
   an angle control mechanism configured to rotate the nonlinear optical crystal so as to control an angle of the electromagnetic wave exit face against an optical axis of the first pump beam; and
   a timing control mechanism configured to control arrival timing of pulses of the first and second pump beams to the nonlinear optical crystal,
   wherein a frequency-tunable terahertz electromagnetic wave, tunable over a wide frequency band spanning from 0.5 to 7 THz, is emitted from the electromagnetic wave exit face, by changing the frequency of the second pump beam, being linked with the change of the external intersection angle and the change of the angle of the electromagnetic wave exit face.

7. The electromagnetic wave generator of claim 6, wherein the timing control mechanism controls the timing by adjusting time lag between excitation light pulses configured to excite the first and second light sources, respectively.

8. The electromagnetic wave generator of claim 6, wherein the timing control mechanism comprises a double pulse YAG laser including:
   a first YAG rod configured to excite the first pump source; and
   a second YAG rod configured to excite the second pump source, wherein the timing is controlled by adjusting time lag between an excitation light pulse from the first YAG rod and another excitation light pulse from the second YAG rod.

9. The electromagnetic wave generator of claim 6, further comprising:
   a beam splitter configured to divide a beam of terahertz electromagnetic wave being emitted from the nonlinear optical crystal; and a feedback detector configured to feed back detected output to the timing control mechanism, by detecting an intensity of the divided beam, wherein the timing control mechanism controls the timing so as to maximize the detected output.

10. An electromagnetic wave generator comprising:

a first pump beam emitter including a first pump source implemented by a first Cr-doped forsterite laser, configured to emit a first pump beam;

a second pump beam emitter including a second pump source implemented by a second Cr-doped forsterite laser, configured to emit a wavelength-tunable second pump beam, the wavelength of which is different from the wavelength of the first pump beam;

a nonlinear optical crystal having an electromagnetic wave exit face, configured to generate an electromagnetic wave of a difference frequency between the first and second pump beams, and to emit the electromagnetic wave from the electromagnetic wave exit face;

an optical system configured to irradiate the first and second pump beams to the nonlinear optical crystal, by adjusting an external intersection angle between the first and second pump beams; and an angle control mechanism configured to rotate the nonlinear optical crystal so as to control an angle of the electromagnetic wave exit face against an optical axis of the first pump beam, wherein a frequency-tunable terahertz electromagnetic wave, tunable over a wide frequency band spanning from 0.5 to 7 THz, is emitted from the electromagnetic wave exit face, by changing the frequency of the second pump beam, being linked with the change of the external intersection angle and the change of the angle of the electromagnetic wave exit face.

11. The electromagnetic wave generator of claim 10, further comprising:

a first off-axial paraboloid reflector configured to reflect the electromagnetic wave emitted from the electromagnetic wave exit face;

a second off-axial paraboloid reflector configured to move on a linear stage against the first off-axial paraboloid reflector, reflecting the electromagnetic wave reflected by the first off-axial paraboloid reflector; and a position controller configured to control position of the second off-axial paraboloid reflector so that the electromagnetic wave emitted with a specific exit angle against the electromagnetic wave exit face can focus into an arbitrary point, irrespective of the exit angle.

12. The electromagnetic wave generator of claim 10, further comprising:

a rotatable first incident mirror configured to reflect the first pump beam so as to adjust an incident angle with which the first pump beam irradiates to the nonlinear optical crystal;

a rotatable second incident mirror configured to reflect the second pump beam so as to adjust another incident angle with which the second pump beam irradiates to the nonlinear optical crystal;

a terahertz-generator rotation stage on which the first and second incident mirrors are mounted, configured to turn around on an exit point, defining the exit point as a central axis of the rotation, wherein the electromagnetic wave emitted with a specific exit angle against the electromagnetic wave exit face is controlled to focus into an arbitrary point, irrespective of the exit angle, by rotating the terahertz-generator rotation stage.

13. The electromagnetic wave generator of claim 10, wherein the nonlinear optical crystal is any one of GaP crystal, $ZnGeP_2$ crystal, and GaSe crystal.

* * * * *